United States Patent
Kim

(10) Patent No.: US 11,838,652 B2
(45) Date of Patent: Dec. 5, 2023

(54) METHOD FOR STORING IMAGE AND ELECTRONIC DEVICE SUPPORTING THE SAME

(71) Applicant: Samsung Electronics Co., Ltd., Suwon-si (KR)

(72) Inventor: Sujung Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 198 days.

(21) Appl. No.: 17/587,377

(22) Filed: Jan. 28, 2022

(65) Prior Publication Data

US 2023/0015139 A1    Jan. 19, 2023

Related U.S. Application Data

(63) Continuation of application No. PCT/KR2022/000738, filed on Jan. 14, 2022.

(30) Foreign Application Priority Data

Jul. 15, 2021  (KR) .................. 10-2021-0092694

(51) Int. Cl.
  *H04N 5/92*      (2006.01)
  *H04R 1/40*      (2006.01)
  (Continued)

(52) U.S. Cl.
  CPC ........... *H04N 23/90* (2023.01); *H04N 5/2624* (2013.01); *H04N 5/9202* (2013.01);
  (Continued)

(58) Field of Classification Search
  None
  See application file for complete search history.

(56) References Cited

U.S. PATENT DOCUMENTS

| 7,583,316 B2 | 9/2009 | Miyashita et al. |
| 9,596,437 B2 | 3/2017 | Zad Issa et al. |

(Continued)

FOREIGN PATENT DOCUMENTS

| CN | 113365013 A | * 9/2021 | .......... H04N 23/632 |
| JP | 2004-147046 A | 5/2004 | |

(Continued)

OTHER PUBLICATIONS

International Search Report dated May 4, 2022, issued in International Application No. PCT/KR2022/000738.

*Primary Examiner* — Paul M Berardesca
(74) *Attorney, Agent, or Firm* — Jefferson IP Law, LLP

(57) ABSTRACT

An electronic device is provided. The electronic device includes a first camera disposed on a first surface to obtain a first image, a second camera disposed on a second surface opposite to the first surface to obtain a second image, a communication module configured to establish communication with an external device, a plurality of microphones, and a processor electrically connected with the first camera, the second camera, the communication module, and the plurality of microphones. The processor is configured to identify an audio reception range for at least some of the plurality of microphones, while the first image and the second image are obtained, store a first audio signal collected through the plurality of microphones with the first image and the second image, when the audio reception range corresponds to a first range, and obtain and synthesize a second audio signal collected by the external device with the first audio signal, when the audio reception range corresponds to a second range narrower than the first range, and store the synthesized audio signal with the first image and the second image.

20 Claims, 20 Drawing Sheets

(51) Int. Cl.
  *H04N 5/262* (2006.01)
  *H04N 23/69* (2023.01)
  *H04N 23/90* (2023.01)
  *H04N 23/63* (2023.01)

(52) U.S. Cl.
  CPC ........... *H04N 23/633* (2023.01); *H04N 23/69* (2023.01); *H04R 1/406* (2013.01)

(56) References Cited

U.S. PATENT DOCUMENTS

| | | |
|---|---|---|
| 11,277,686 B2 | 3/2022 | Kim et al. |
| 2006/0044396 A1 | 3/2006 | Miyashita et al. |
| 2012/0308220 A1* | 12/2012 | Ohtsuka ................ G03B 17/14 396/312 |
| 2013/0226593 A1* | 8/2013 | Magnusson ............ H04N 9/806 704/276 |
| 2015/0054943 A1 | 2/2015 | Zad Issa et al. |
| 2015/0124167 A1* | 5/2015 | Arrasvuori ............. H04R 3/005 348/485 |
| 2015/0163587 A1 | 6/2015 | Li |
| 2015/0326793 A1* | 11/2015 | Mäkinen ................ H04N 23/69 348/240.99 |
| 2019/0124311 A1* | 4/2019 | Ohtsuka ................ G11B 27/031 |
| 2021/0044896 A1 | 2/2021 | Kim et al. |
| 2022/0224828 A1* | 7/2022 | Lim ....................... H04N 23/69 |
| 2022/0272200 A1* | 8/2022 | Chen ...................... H04R 3/005 |

FOREIGN PATENT DOCUMENTS

| | | |
|---|---|---|
| JP | 2011-199855 A | 10/2011 |
| JP | 4840421 B2 | 12/2011 |
| JP | 2015-115952 A | 6/2015 |
| JP | 2016-009950 A | 1/2016 |
| JP | 2017-005322 A | 1/2017 |
| KR | 10-0219147 B1 | 9/1999 |
| KR | 10-1322081 B1 | 10/2013 |
| KR | 10-2175602 B1 | 11/2020 |
| KR | 10-2021-0017229 A | 2/2021 |

* cited by examiner (a)

(b)

METHOD FOR STORING IMAGE AND ELECTRONIC DEVICE SUPPORTING THE SAME

CROSS-REFERENCE TO RELATED APPLICATION(S)

This application is a continuation application, claiming priority under § 365(c), of an International application No. PCT/KR2022/000738, filed on Jan. 14, 2022, which is based on and claims the benefit of a Korean patent application number 10-2021-0092694, filed on Jul. 15, 2021, in the Korean Intellectual Property Office, the disclosure of which is incorporated by reference herein in its entirety.

TECHNICAL FIELD

The disclosure relates to an electronic device. More particularly, the disclosure relates to a method for storing an image and the electronic device supporting the same.

BACKGROUND ART

Recently, with the development of digital technology, electronic devices, such as mobile communication terminals, digital organizers, smartphones, table personal computers (PCs), and wearable devices, configured to perform various functions have come to the market. Examples of such various functions are a data and voice communication function, a function of taking a picture or video by means of a camera, a voice storage function, a function of playing a music file by means of a speaker system, a function of displaying an image or a video, and the like.

More particularly, the electronic device may provide various functions for taking a picture of a subject using its camera. For example, a user may take a picture by selectively using a front camera and/or a rear camera of the electronic device, may operate a control option of the camera to zoom in on an image with respect to a specific subject, may manually/automatically adjust a focus of the image, or may capture a desired image using a face recognizer or the like.

Meanwhile, the electronic device may capture a voice or a sound generated by a subject when taking a picture of the subject or scene and may store the collected voice or sound together with an image and may perform an audio zoom function (or an audio focus function). The audio zoom function refers to a processing technique for attenuating a noise audio signal and emphasizing only a desired target audio signal by adjusting an oriented direction and/or angle of a microphone depending on a zoom magnification of a camera module, when taking a video.

The above information is presented as background information only to assist with an understanding of the disclosure. No determination has been made, and no assertion is made, as to whether any of the above might be applicable as prior art with regard to the disclosure.

DISCLOSURE

Technical Problem

The above-mentioned electronic device may perform the audio zoom function, while a plurality of images are captured at the same time by the front camera and the rear camera. In this case, a voice or a sound generated by subjects located in front of and behind the electronic device may be a target audio signal.

However, when an oriented direction and/or angle of a microphone is concentrated on the subject located in front of (or behind) the electronic device depending on a zoom magnification of the camera, the target audio signal with respect to the subject located behind (or in front of) the electronic device may be processed and attenuated as a noise audio signal.

Aspects of the disclosure are to address at least the above-mentioned problems and/or disadvantages and to provide at least the advantages described below. Accordingly, an aspect of the disclosure is to provide a method for storing an image to obtain and storing an audio signal collected by an external device while the audio zoom function is performed together with the image and an electronic device supporting the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first camera disposed on a first surface of the electronic device to obtain a first image, a second camera disposed on a second surface of the electronic device, the second surface being opposite to the first surface, to obtain a second image, a communication module configured to establish communication with an external device, a plurality of microphones, and a processor electrically connected with the first camera, the second camera, the communication module, and the plurality of microphones. The processor may be configured to identify an audio reception range for at least some of the plurality of microphones, while the first image and the second image are obtained, store a first audio signal collected through the plurality of microphones with the first image and the second image, when the audio reception range corresponds to a first range, and obtain and synthesize a second audio signal collected by the external device with the first audio signal, when the audio reception range corresponds to a second range narrower than the first range, and store the synthesized audio signal with the first image and the second image.

In accordance with another aspect of the disclosure, a method of an electronic device is provided. The method includes obtaining a first image by means of a first camera disposed on a first surface of the electronic device, obtaining a second image by means of a second camera disposed on a second surface of the electronic device, the second surface being opposite to the first surface, identifying an audio reception range for at least some of a plurality of microphones provided in the electronic device, while the first image and the second image are obtained, storing a first audio signal collected through the plurality of microphones with the first image and the second image, when the audio reception range corresponds to a first range, and obtaining and synthesizing a second audio signal collected by an external device communicatively connected with the electronic device with the first audio signal, when the audio reception range corresponds to a second range narrower than the first range, and storing the synthesized audio signal with the first image and the second image.

Advantageous Effects

The electronic device according to various embodiments disclosed in the disclosure may obtain and store an audio signal collected by an external device while an audio zoom function is executed together with an image, thus obtaining an audio signal having sound quality of a certain level or more with respect to a subject located on a front surface of the electronic device and obtaining an audio signal having the sound quality of the certain level or more with respect to a subject located on a rear surface of the electronic device.

Effects capable of being obtained from the disclosure are not limited to the effects described above.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
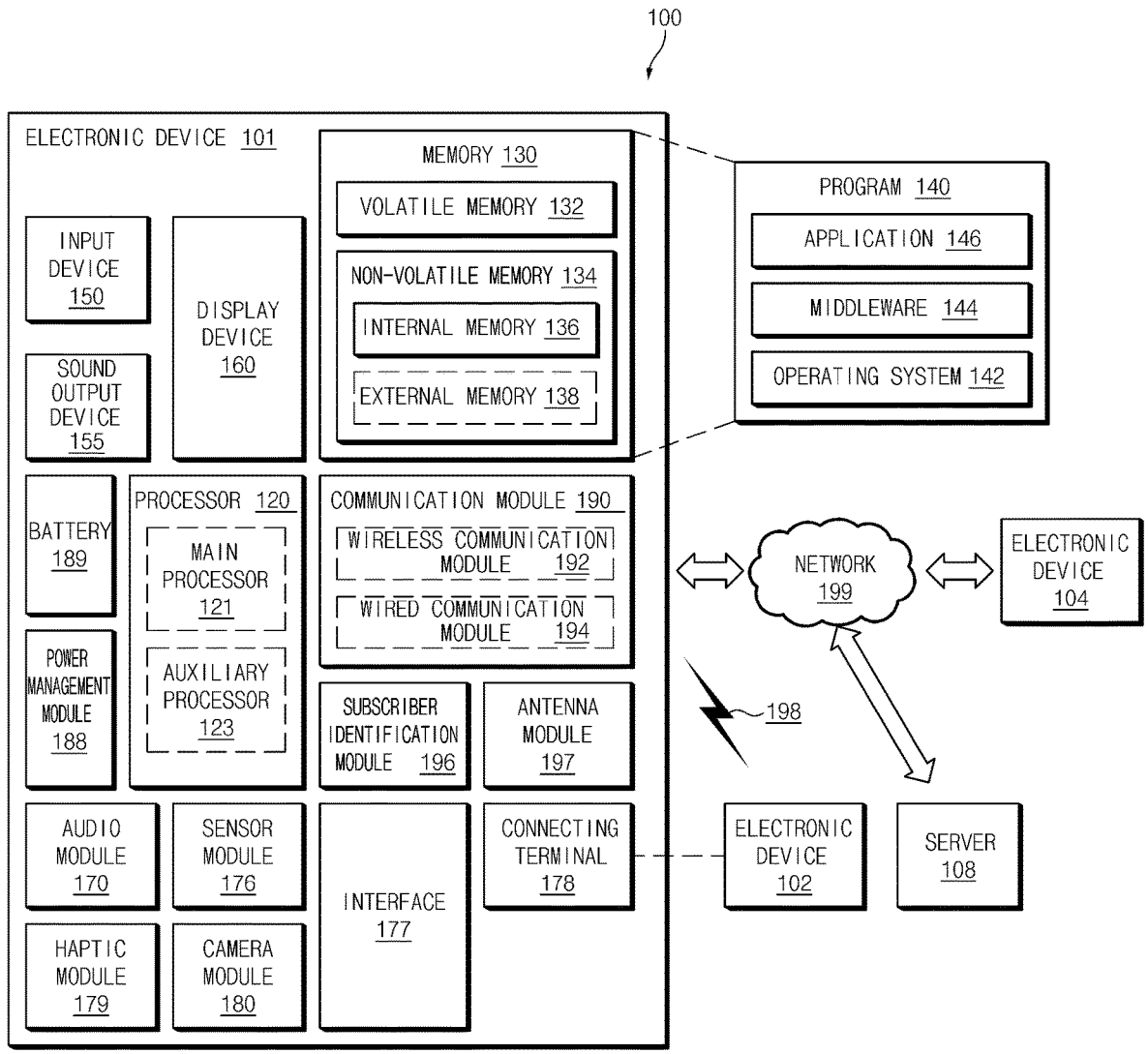
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in the non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
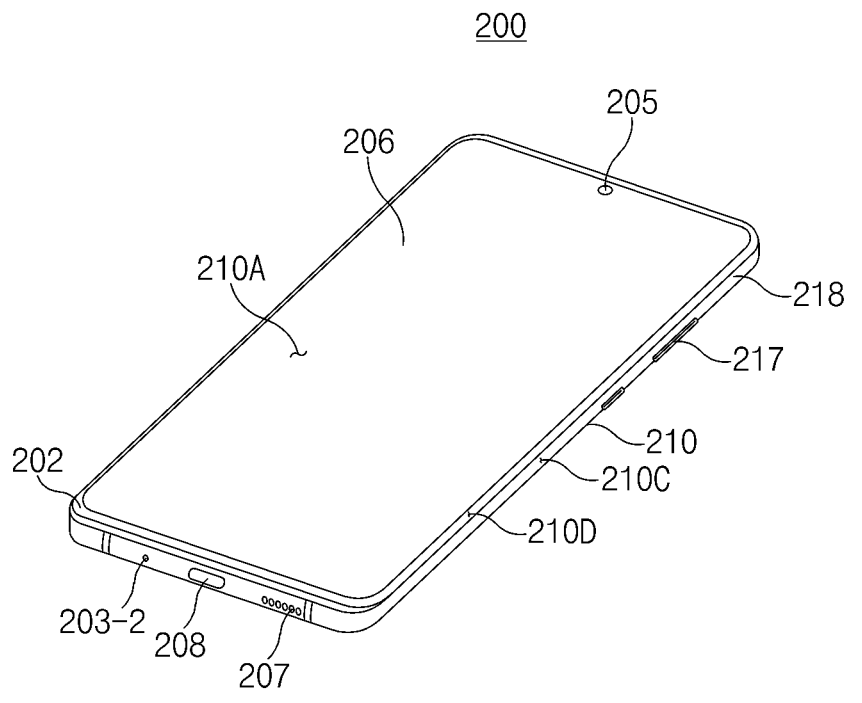
FIG. 2A is a front perspective view of an electronic device according to an embodiment of the disclosure.
Figure 2A:
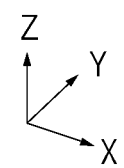
Figure 2A:
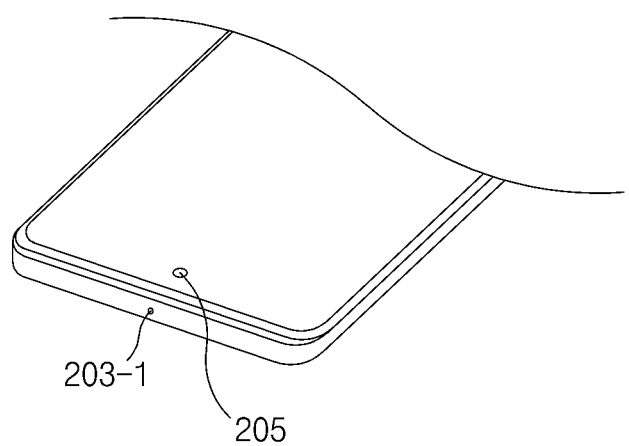
Figure 2B:
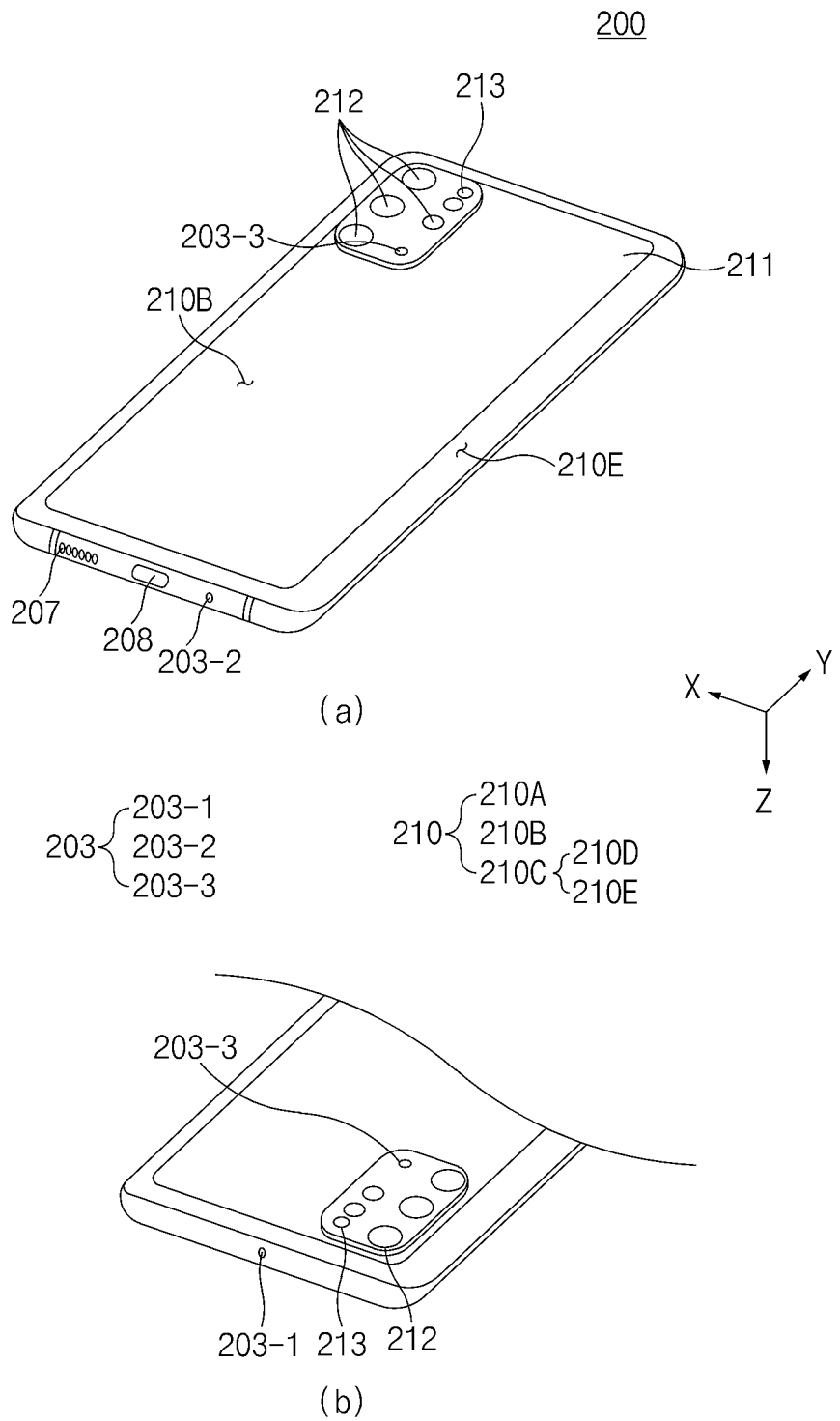
FIG. 2B is a rear perspective view of an electronic device according to an embodiment of the disclosure.

FIG. 2A is a front perspective view of an electronic device according to an embodiment of the disclosure. FIG. 2B is a rear perspective view of an electronic device according to an embodiment of the disclosure.

Referring to part (a) of FIG. 2A and part (a) of FIG. 2B, an electronic device 200 (e.g., an electronic device 101 of FIG. 1) may include a housing 210 including a first surface (e.g., a front surface) 210A, a second surface (e.g., a rear surface) 210B, a third surface (e.g., a side surface) 210C surrounding a space between the first surface 210A and the second surface 210B. For example, the housing 210 may refer to a structure forming some of the first surface 210A, the second surface 210B, and the third surface 210C.

In an embodiment, the first surface 210A may be formed by a front plate 202, at least a portion of which is substantially transparent, (e.g., a glass plate including various coating layers or a polymer plate). The second surface 210B may be formed by a back plate 211 which is substantially opaque. For example, the back plate 211 may be formed by coated or colored glass, ceramics, polymer, metal (e.g., aluminum, stainless steel (STS), or magnesium), or a combination of at least two of the above-mentioned materials. The third surface 210C may be coupled to the front plate 202 and the back plate 211 and may be formed by a side bezel structure (or a "frame structure") 218 including metal and/or polymer.

In another embodiment, the back plate 211 and the side bezel structure 218 may be integrally formed with each other and may include the same material (e.g., a metal material, such as aluminum).

In the embodiment illustrated, the front plate 202 may include two first regions 210D which are bent and seamlessly extended in the direction of the back plate 211 from a partial region of the first surface 210A. The first regions 210D may be located at both sides of a long edge of the front plate 202.

In the embodiment illustrated, the back plate 211 may include two second regions 210E which are bent and seamlessly extended in the direction of the front plate 202 from a partial region of the second surface 210B. The second regions 210E may be located at both sides of a long edge of the back plate 211.

In another embodiment, the front plate 202 (or the back plate 211) may include only one of the first regions 210D (or the second regions 210E). Furthermore, in another embodiment, the front plate 202 (or the back plate 211) may fail to include some of the first regions 210D (or the second regions 210E).

In an embodiment, as viewed from a side surface of the electronic device 200, the side bezel structure 218 may have a first thickness (or width) in a side direction (e.g., a short edge) in which the above-mentioned first regions 210D or the above-mentioned second regions 210E are not included and may have a second thickness thinner than the first thickness in a side direction (e.g., a long edge) including the first regions 210D or the second regions 210E.

In an embodiment, the electronic device 200 may include at least one of a display 201, a microphone array 203, a front surface 206, a speaker 207, camera modules 205 and 212 (e.g., a camera module 180 of FIG. 1), a key input device 217 (e.g., an input device 150 of FIG. 1), a light emitting element (not shown), and a connector hole 208. In another embodiment, the electronic device 200 may omit at least one (e.g., the key input device 217 or the light emitting element (not shown)) of the above-mentioned components or may additionally include another component (e.g., a sensor module (e.g., a sensor module 176 of FIG. 1)).

According to an embodiment, the display 201 may be exposed through at least a portion of the front plate 202. For example, at least a portion of the display 201 may be exposed through the front plate 202 including the first surface 210A and the first regions 210D of the third surface 210C.

In an embodiment, the shape of the display 201 may be formed to be substantially the same as an adjacent outer shape of the front plate 202. In another embodiment (not illustrated), to expand the area where the display 201 is exposed, an interval between an outline of the display 201 and an outline of the front plate 202 may be formed substantially the same.

In an embodiment, a surface (or the front plate 202) of the housing 210 may include a display region where content is displayed by means of pixels as the display 201 is visually exposed. For example, the display region may include the first surface 210A, and the first regions 210D of the third surface 210C.

In another embodiment, the display 201 may include a touch sensing circuit, a pressure sensor capable of measuring the intensity (or pressure) of a touch, and/or a digitizer for detecting a magnetic stylus pen or may be disposed adjacent thereto.

In an embodiment, the microphone array 203 may be including a plurality of microphones 203-1, 203-2, and 203-3. For example, the plurality of microphones 203-1, 203-2, and 203-3 may be arranged on a partial region of the third surface 210C and a partial region of the second surface 210B. For example, as shown in part (b) of FIG. 2A and part (b) of FIG. 2B, the first microphone 203-1 may be disposed on a partial region of the third surface 210C (e.g., a partial region of an upper end of the electronic device 200), and the second microphone 203-2 may be disposed on another region of the third surface 210C (e.g., a partial region of a lower end of the electronic device 200). In addition, the third microphone 203-3 may be disposed on a partial region of the second surface 210B.

In an embodiment, the speaker 207 may be formed in a portion of the third surface 210C of the electronic device 200. However, this is merely illustrative, and the disclosure is not limited thereto. For example, positions of the above-mentioned microphone array 203 and the above-mentioned speaker 207 may be different from the above-mentioned positions.

In an embodiment, the key input device 217 may be disposed on the side surface 210C (e.g., the first regions 210D and/or the second regions 210E) of the housing 210. In another embodiment, the electronic device 200 may fail to include a part or all of the key input device 217, and the key input device 217 not included therein may be implemented on the display 201 in the form of a soft key. In another embodiment, the key input device 217 may include a sensor module (not shown).

In an embodiment, the connector hole 208 may receive a connector. The connector hole 208 may be disposed on the side surface 210C of the housing 210. For example, the connector hole 208 may be disposed on the side surface 210C to be adjacent to at least a part of the second microphone 203-2 and the speaker 207.

In an embodiment, the camera modules 205 and 212 may include the first camera module 205 configured to receive light through a camera region of the first surface 210A of the electronic device 200, the second camera module 212 exposed to the second surface 210B, and/or a flash 213.

In an embodiment, the second camera module 212 may include a plurality of camera modules (e.g., a dual camera, a triple camera, or a quad camera). Herein, the second camera module 212 may not necessarily be limited to including the plurality of camera modules, and include one camera module.

According to an embodiment, the first camera module 205 and/or the second camera module 212 may include one lens or a plurality of lenses, an image sensor, and/or an image signal processor. The flash 213 may include, for example, a light-emitting diode or a xenon lamp. In an embodiment, two or more lenses (an infrared camera or wide-angle and telephoto lenses) and image sensors may be arranged on one surface of the electronic device 200 (e.g., in the housing 210 to face a direction where the second surface 210B is oriented).

Figure 3:
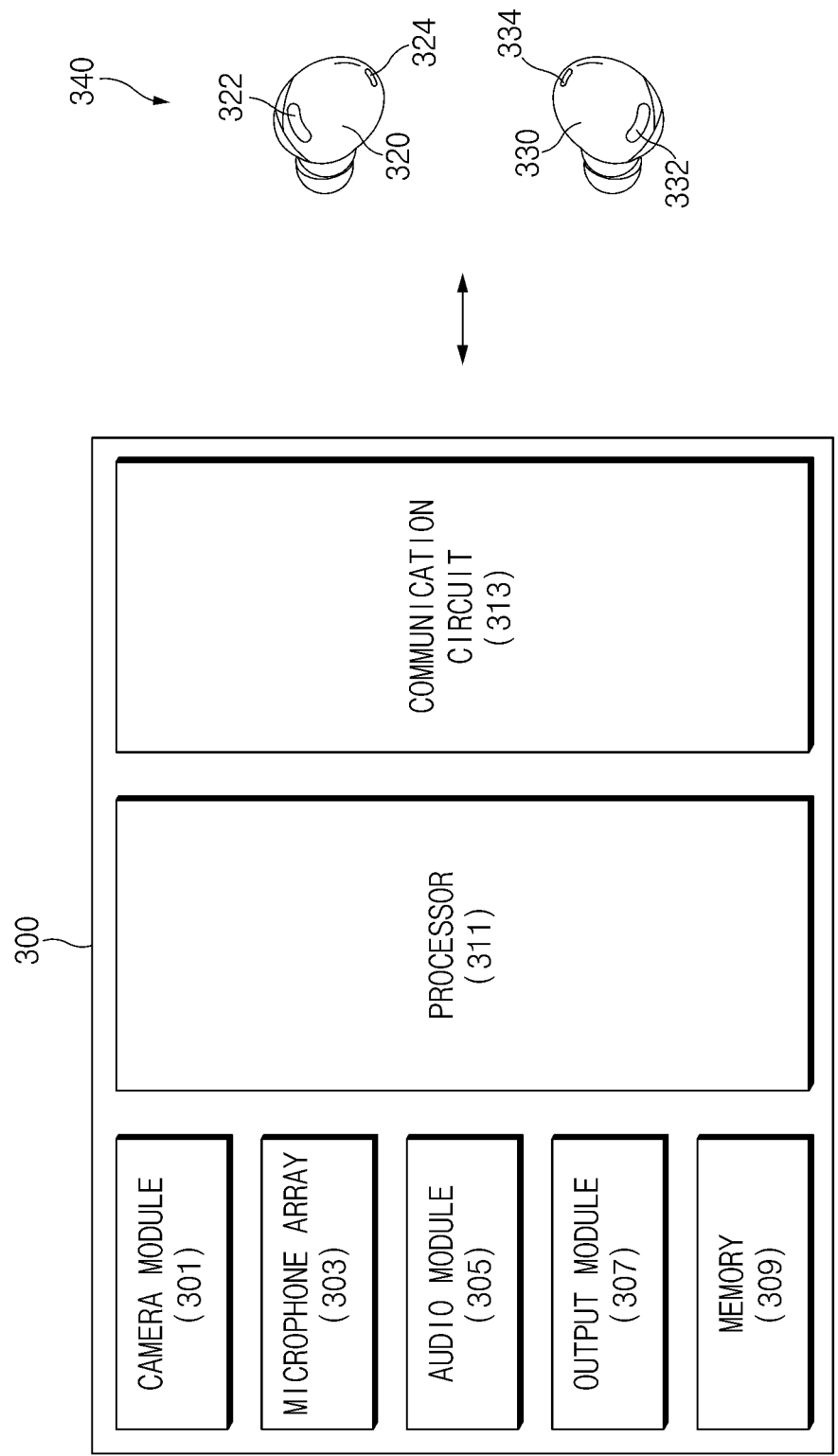
FIG. 3 is a drawing illustrating a configuration of an electronic device according to an embodiment of the disclosure.
Figure 4A:
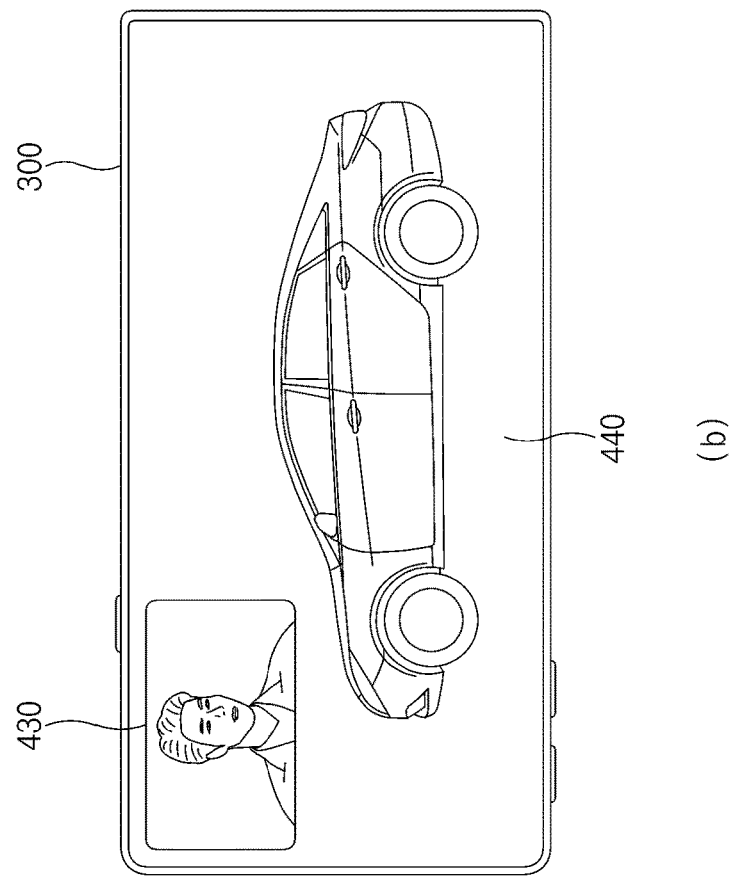
FIG. 4A is a drawing illustrating an image output operation of an electronic device according to an embodiment of the disclosure.
Figure 4A:
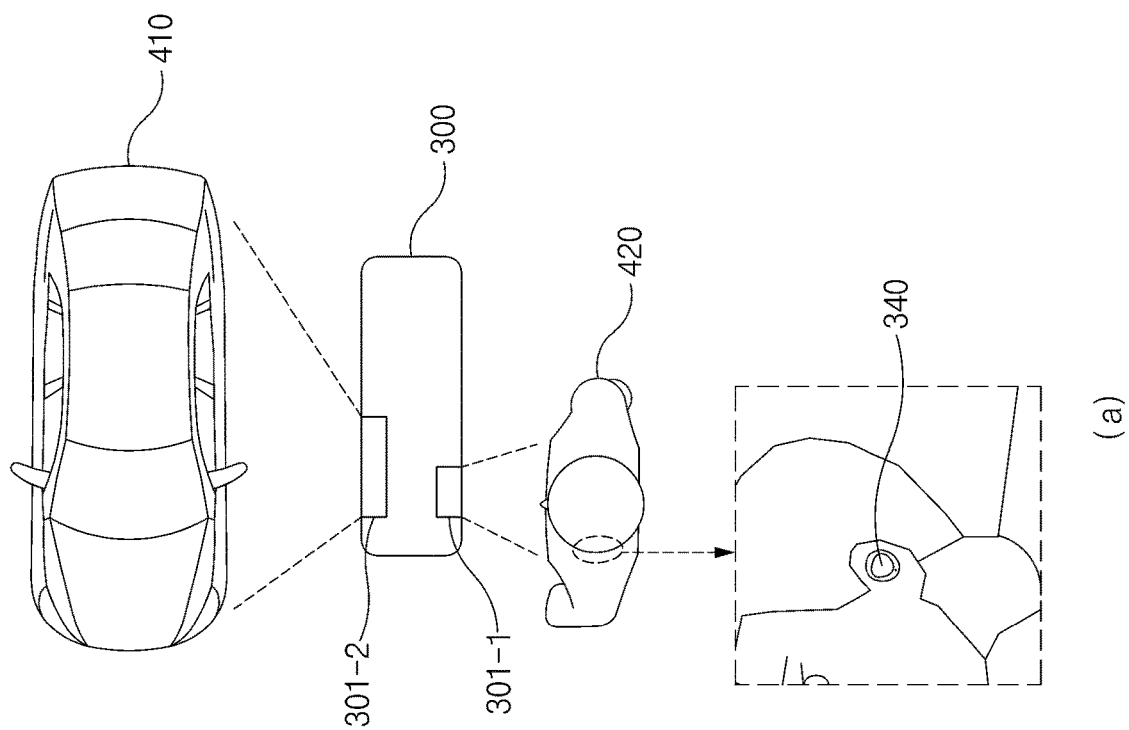
Figure 4B:
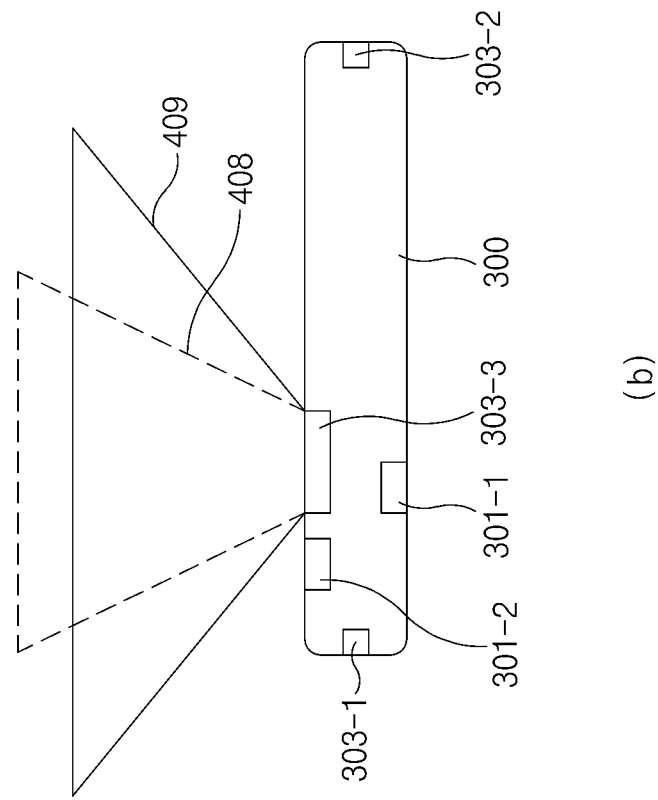
FIGS. 4B and 4C are drawings illustrating an audio zoom operation of an electronic device according to various embodiments of the disclosure.
Figure 4B:
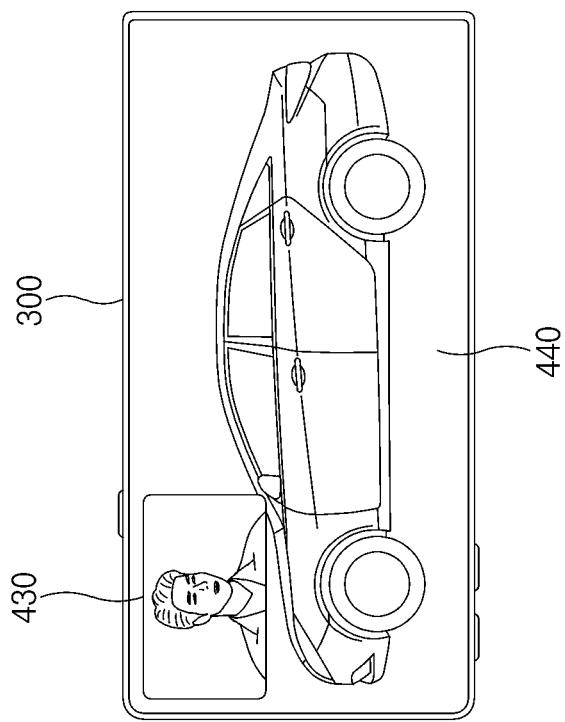
Figure 4C:
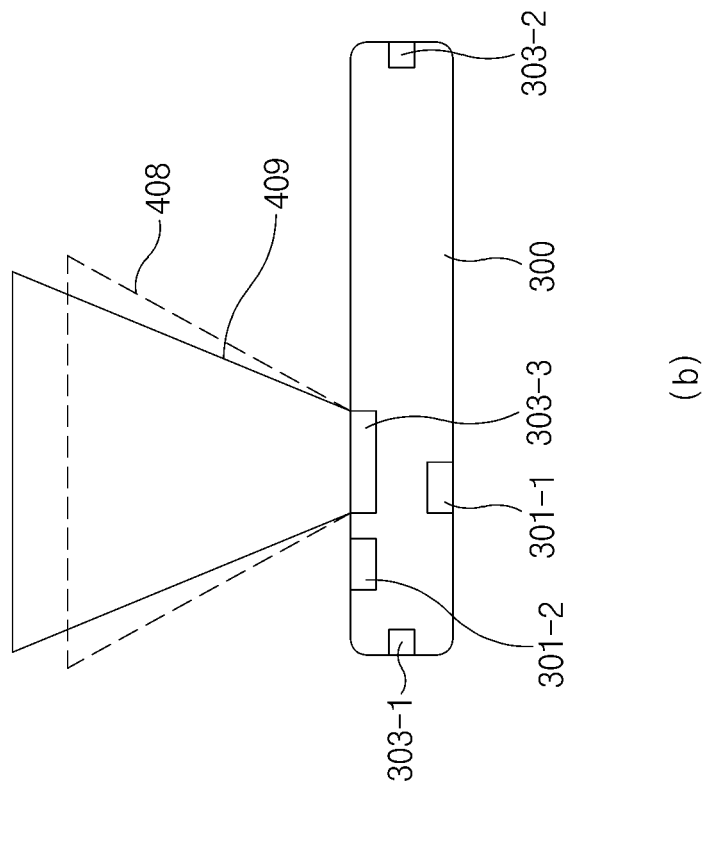
Figure 4C:
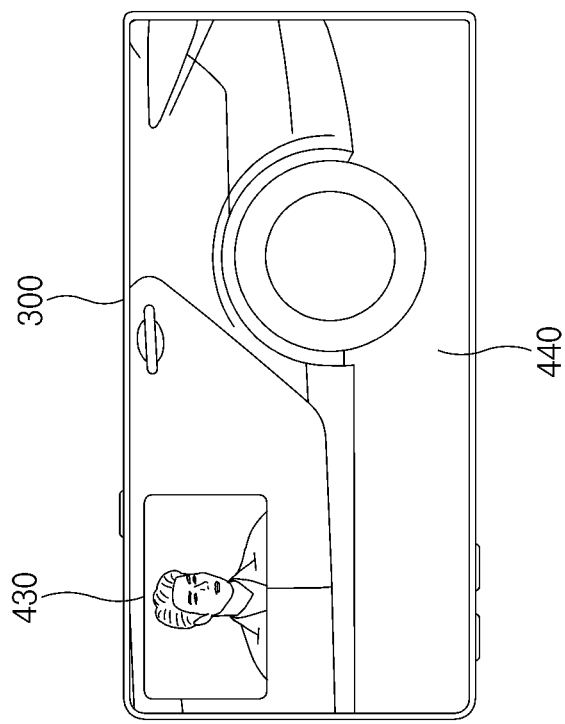
Figure 4D:
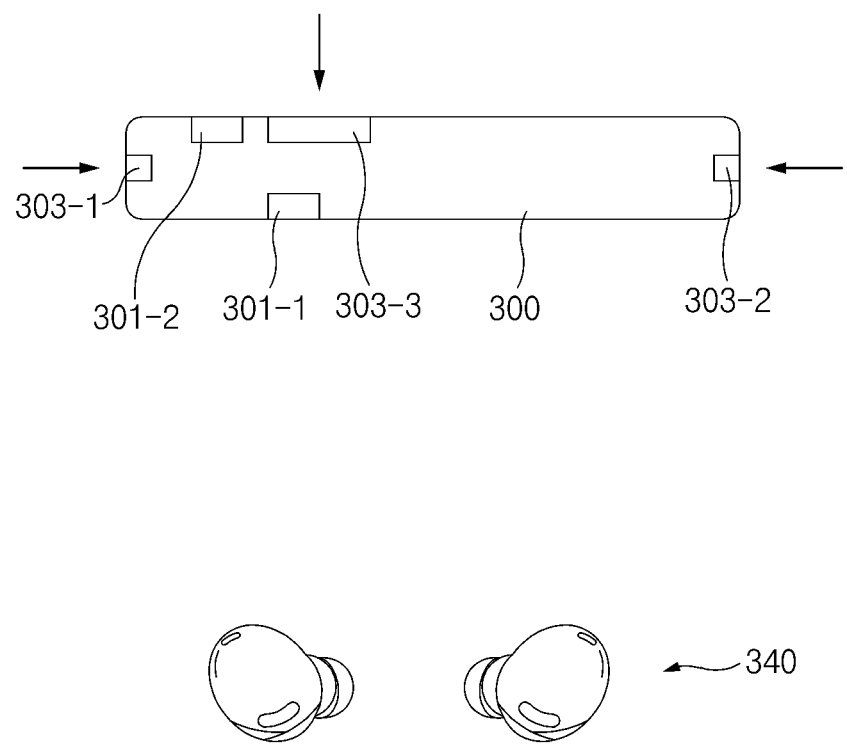
FIGS. 4D and 4E are drawings illustrating an operation of obtaining an audio signal from an external device in an electronic device according to various embodiments of the disclosure.
Figure 4E:
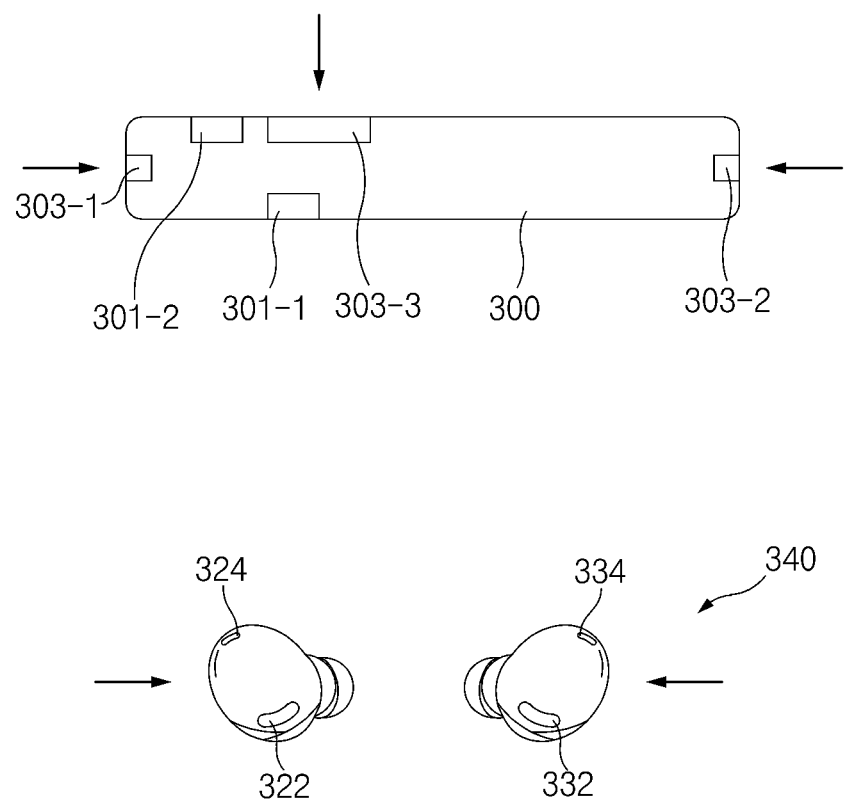
Figure 4F:
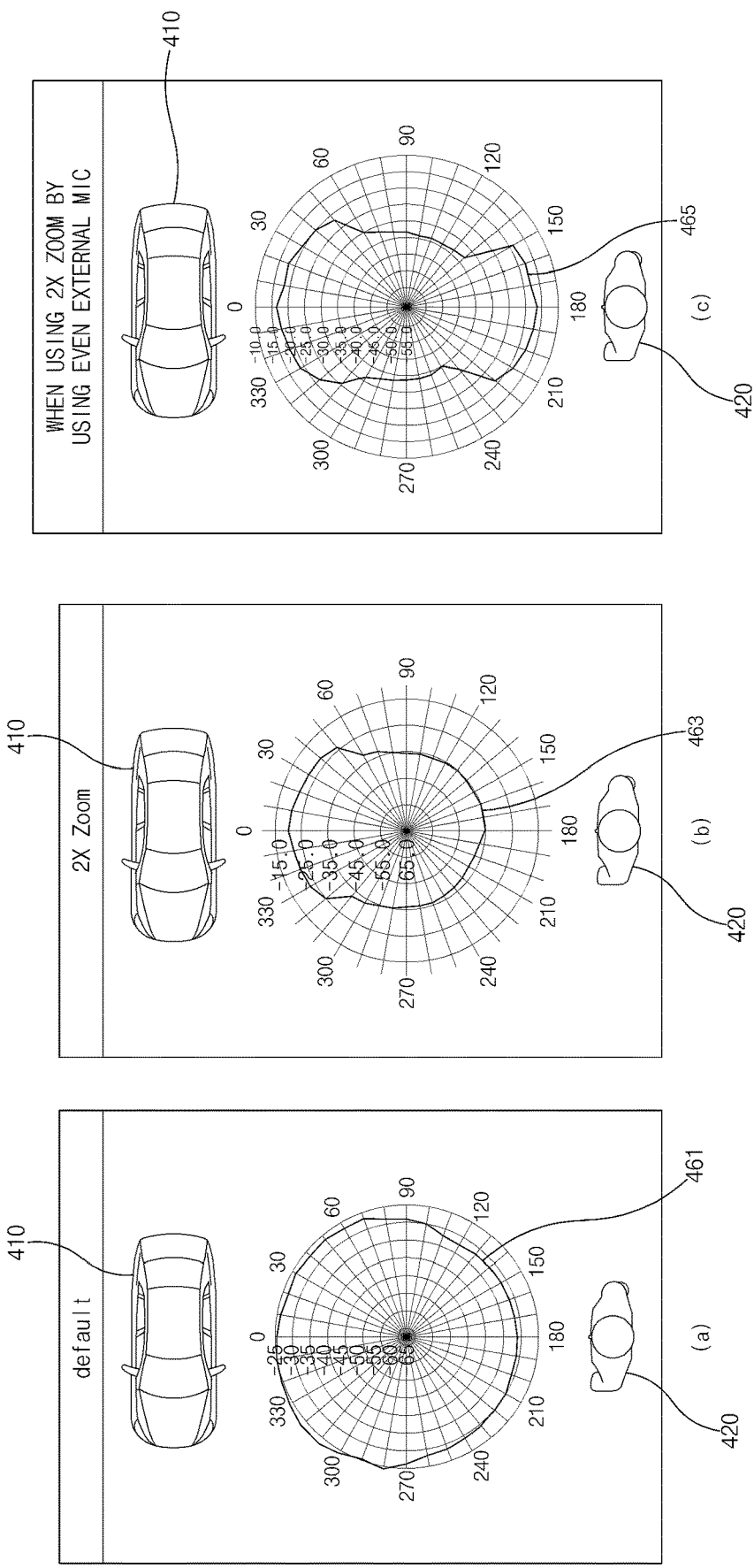
FIG. 4F is a drawing illustrating performance of a microphone array of an electronic device according to an embodiment of the disclosure.

FIG. 3 is a drawing illustrating a configuration of an electronic device according to an embodiment of the disclosure. FIG. 4A is a drawing illustrating an image output operation of an electronic device according to an embodiment of the disclosure. FIGS. 4B and 4C are drawings illustrating an audio zoom operation of an electronic device according to various embodiments of the disclosure. Furthermore, FIGS. 4D and 4E are drawings illustrating an operation of obtaining an audio signal from an external device in an electronic device according to various embodiments of the disclosure. FIG. 4F is a drawing illustrating performance of a microphone array of an electronic device according to an embodiment of the disclosure.

Referring to FIGS. 3 and 4A to 4F, an electronic device 300 (e.g., an electronic device 101 of FIG. 1) according to various embodiments may include a camera module 301 (e.g., a camera module 180), a microphone array 303 (e.g., a microphone array 203 of FIGS. 2A and 2B), an audio module 305 (e.g., an audio module 170 of FIG. 1), an output module 307 (e.g., a display module 160 of FIG. 1), a memory 309 (e.g., a memory 130 of FIG. 1), a processor 311 (e.g., a processor 120 of FIG. 1), and a communication circuit 313 (e.g., a first communication module 190 of FIG. 1).

The above-mentioned configurations of the electronic device 300 are one embodiment, and various embodiments of the disclosure are not limited thereto. For example, the electronic device 300 may be implemented to have more configurations than the configurations shown in FIG. 3 or have less configurations than the configurations shown in FIG. 3. For example, at least one input module (e.g., an input module 150), at least one sensor module (e.g., a sensor module 176), or a power management module (e.g., a power management module 176) may be included as a configuration of the electronic device 300.

According to various embodiments, the camera module 301 may process an image (e.g., a still image or a moving image) obtained by an image sensor in an image capture mode.

According to an embodiment, the camera module 301 may perform zoom-in capable of increasing a zoom magnification such that an image screen is concentrated on a specific subject a user is interested in upon image capture or zoom-out capable of decreasing a zoom magnification such that the user puts the subject of a wider range on an image screen. For example, the camera module 301 may change a zoom magnification of the camera module 301, in response to a user input (e.g., a touch event on the output module 307).

According to an embodiment, the camera module 301 may include a plurality of cameras. The plurality of cameras may include a standard camera, a wide-angle camera, and a telephoto camera, and each of the plurality of cameras may selectively adjust its zoom magnification.

For example, at least one of the plurality of cameras may be a first camera 301-1 (e.g., a camera module 205 of FIG. 2A) configured to be disposed on a first surface (e.g., a front surface) of the electronic device 300 to obtain a first image with respect to the first surface, and at least another thereof may be a second camera 301-2 (e.g., a camera module 212 of FIG. 2B) configured to be disposed on a second surface (e.g., a rear surface) of the electronic device 300, which is opposite to the first surface, to obtain a second image with respect to the second surface. However, this is merely illustrative, and the disclosure is not limited thereto. For example, the first camera 301-1 and the second camera 301-2 may be arranged on the same surface of the electronic device 300 to obtain images with respect to different directions.

According to various embodiments, the microphone array 303 may be configured with a plurality of microphones configured to convert and output an external source into an electrical audio signal. For example, the plurality of microphones may receive and convert a sound generated from at least one external subject of the electronic device 300 into an audio signal, upon image capture by means of the camera module 301, and may output the converted audio signal to the processor 311 and/or the audio module 305.

According to an embodiment, the microphone array 303 may include at least one microphone configured to selectively collect an audio signal generated in a specified direction. For example, the microphone array 303 may be configured with a first microphone 303-1 (e.g., a first microphone 2031—) disposed on a partial region of an upper end of the electronic device 300, a second microphone 303-2 (e.g., a second microphone 203-2) disposed on a partial region of a lower end of the electronic device 300, and a third microphone 303-3 (e.g., a third microphone 203-3) disposed on a partial region of a rear part of the electronic device 300. The third microphone 303-3 may include a directional antenna configured to adjust an audio reception range with respect to the front the second surface of the electronic device 300 is facing and selectively collect a target audio signal. However, this is merely illustrative, and the disclosure is not limited thereto. For example, the first microphone 303-1 and/or the second microphone 303-2 may be configured to have directionality.

According to various embodiments, the audio module 305 may process the audio signal obtained through the microphone array 303.

According to an embodiment, an ambient signal or noise which should be attenuated or removed in the process of processing a target signal to be processed may be included in the audio signal obtained through the microphone array 303. In this regard, the audio module 305 may perform various processing of the audio signal to clear the signal obtained through the microphone array 303 and remove noise.

According to an embodiment, the audio module 305 may set an audio signal received in a specific direction with respect to the electronic device 300 to a target signal, may set an audio signal received in a direction except for the specific direction to an ambient signal, that is, noise, and may emphasize the target signal among audio signals to attenuate noise among the audio signals. For example, the audio module 305 may form a sound beam corresponding to a range of receiving a sound generated from a subject of interest which provides the target signal and may process the audio signal such that the plurality of audio signals have directionality depending on the sound beam.

According to various embodiments, the output module 307 may output various pieces of visual information based on control of the processor 311. According to an embodiment, at least some of the various pieces of visual information may be associated with an image acquisition operation. However, this is merely illustrative, and the disclosure is not limited thereto. For example, the output module 307 may be configured with various output devices, such as a sound output module (e.g., a sound output module 155 of FIG. 1)

configured to output audio information and a haptic module (e.g., a haptic module 179 of FIG. 1) configured to output tactile information.

According to an embodiment, the communication circuit 313 may assist in performing wireless communication with at least one external device 340. As shown in FIGS. 3 and 4A, the at least one external device 340 may be a wearable device in the form of an earphone worn on a part (e.g., ears) of the body of a user 420, which may be configured with a first unit device 320 (e.g., a right unit) including at least one first unit microphone 322 and 324 and a second unit device 330 (e.g., a left unit) including at least one second unit microphone 332 and 334. For example, the external device 340 may collect a voice and a sound generated from the user 420 or around the user 420, by means of at least one of the at least one unit microphone 322, 324, 332, and 334 in a state where it is worn on the body of the user 420. However, this is merely illustrative, and the disclosure is not limited thereto. For example, the at least one external device 340 may be implemented in various forms like a wearable device in the form of spectacles or a wearable device in the form of earphones or may be configured with only one unit device (e.g., the first unit device 320 or the second unit device 330). Furthermore, the external device 340 may be another electronic device disposed adjacent to the user.

According to an embodiment, the communication circuit 313 may be a device including hardware and software for transmitting and receiving a signal (e.g., a command or data) between the electronic device 300 and the at least one external device 340. For example, the audio signal collected by the at least one external device 340 may be provided to the electronic device 300 through the communication circuit 313.

For example, the communication circuit 313 may include a communication module for supporting ultra wide band (UWB) communication. For example, the communication circuit 313 may include an antenna module including a plurality of antennas to assisting in operating ultra wide band communication capable of transmitting or receiving a large amount of information (e.g., a signal or data) at a low power using a wide frequency band (e.g., 3.1 GHz to 10.6 GHz). However, this is merely illustrative, and the disclosure is not limited thereto. For example, the communication circuit 313 may include an infrared data association (IrDA), wireless fidelity (wi-fi), Wi-Fi Direct, or Bluetooth communication module.

According to various embodiments, the processor 311 may be operatively connected with the camera module 301, the microphone array 303, the audio module 305, the output module 307, the memory 309, and/or the communication circuit 313 and may control various components (e.g., hardware or software components) of the electronic device 300. For example, the processor 311 may output the image obtained by means of the camera module 301 through the output module 307.

According to an embodiment, as shown in part (a) of FIG. 4A, the processor 311 may output a first image 430 with respect to a first direction (e.g., an image with respect to a first subject 420), which is obtained by means of the first camera 301-1 of the electronic device 300, and may output a second image 440 with respect to a second direction (e.g., an image with respect to a second subject 410), which is obtained by means of the second camera 301-2 of the electronic device 300. For example, the processor 311 may output the first image 430 and the second image 440 as one screen. In this regard, as shown in part (b) of FIG. 4A, the processor 311 may output the first image 430 (or the second image 440) in the form of a pop-up to be overlapped with at least a portion of the second image 440 (or the first image 430) using a picture in picture (PIP) function. However, this is merely illustrative, and the disclosure is not limited thereto. For example, the processor 311 may divide a display region of the output module 307 into a first region and a second region, may output the first image 430 through the first region, and may output the second image 440 through the second region.

According to an embodiment, the processor 311 may perform an audio zoom function (or an audio focus function), while the image (e.g., the first image and/or the second image) obtained by means of the camera module 301 is output. The audio zoom function may be a processing technique for attenuating a noise audio signal and emphasizing only a desired target audio signal by adjusting an oriented direction and/or angle of a microphone depending on a zoom magnification of the camera module 301, when the image is captured.

For example, the processor 311 may form a sound beam corresponding to the zoom magnification of the camera module 301 and may process an audio signal to have directionality depending on the sound beam. For example, when the zoom magnification of the second camera 301-2 (or the first camera 301-1) meets a specified first condition (e.g., when the zoom magnification is set to one time or when the zoom magnification is reduced), as shown in part (a) of FIG. 4B, the processor 311 may adjust an audio reception range (or a width of the sound beam) 409 such that the oriented angle of the microphone array (e.g., the third microphone 303-3) is widened according to the zoom magnification, as shown in part (b) of FIG. 4B. At this time, the processor 311 may widen the oriented angle of the microphone array 303 to about 360 degrees. On the other hand, when the zoom magnification of the second camera 301-2 (or the first camera 301-1) meets a specified second condition (e.g., when the zoom magnification is set to two times or more or when the zoom magnification is enlarged), as shown in part (a) of FIG. 4C, the processor 311 may adjust the audio reception range 409 such that the oriented angle of the microphone array 303 (e.g., the third microphone 303-3) is narrowed according to the zoom magnification, as shown in part (b) of FIG. 4C. At this time, the processor 311 may narrow the oriented angle of the microphone array 303 to about 10 degrees.

According to an embodiment, the processor 311 may synthesize and store the audio signal processed by the audio module 305 with the image obtained by means of the camera module 301 in the inside (e.g., a memory 309) of the electronic device 300 or in the outside (e.g., an electronic device 102 or 104 or a server 108) of the electronic device 300.

In this regard, additionally or alternatively, while the audio zoom function is performed, the processor 311 may obtain and synthesize the audio signal collected by the at least one external device 340, communication of which is established, with an image.

For example, as shown in part (b) of FIG. 4B, the microphone array 303 having an audio reception range 409 wider than a reference range 408 may have performance capable of obtaining an audio signal having sound quality of a certain level or more with respect to a first subject 420 located in front of the electronic device 300 and a second subject 410 located behind the electronic device 300, as a polar pattern 461 shown in FIG. 4F means. In this regard, when the audio reception range 409 of the microphone array 303 is wider than the reference range 408 (e.g., the zoom magnification of the second camera 301-2 (and/or the first camera 301-1) meets the specified first condition), like an arrow shown in FIG. 4D, the processor 311 may obtain an audio signal associated with the first subject 420 and/or the second subject 410 using the microphone array 303.

For another example, as shown in part (b) of FIG. 4C, the microphone array 303 having the audio reception range 409 narrower than the reference range 408 may have performance capable of obtaining an audio signal, sound quality of which is relatively lower with respect to the front (e.g., the first subject 420) the front surface of the electronic device 300 is facing, by intensively obtaining an audio signal at a front partial region the rear surface of the electronic device 300 is facing, as a polar pattern 463 shown in FIG. 4F means. In this regard, when the audio reception range 409 of the microphone array 303 is narrower than the reference range 408 (e.g., the zoom magnification of the second camera 301-2 meets the specified second condition), like an arrow shown in FIG. 4E, the processor 311 may obtain an audio signal using the microphone array 303 and may obtain an audio signal collected by the at least one external device 340 which is located adjacent to the first subject 420 relatively located in front of the electronic device 300 or is worn on the first subject 420. Thus, as a polar pattern 465 shown in FIG. 4F means, when the audio reception range 409 of the microphone array 303 is narrower than the reference range 408 (e.g., when the zoom magnification of the second camera 301-2 meets the specified second condition), the processor 311 may obtain an audio signal having sound quality of a certain level or more with respect to the first subject 420 located in front of the electronic device 300, as well as an audio signal with respect to the second subject 410 located behind the electronic device 300.

However, this is merely illustrative, and the disclosure is not limited thereto. For example, the processor 311 may obtain and synthesize an audio signal collected by the at least one external device 340, communication of which is established, with an image depending on the zoom magnification of the camera module 301 irrespective of the audio zoom function. For example, when at least one of the first camera 301-1 and the second camera 301-2 performs zoom-out (or zoom-in), the processor 311 may obtain an audio signal using the microphone array 303. On the other hand, when at least one of the first camera 301-1 and the second camera 301-2 performs zoom-in (or zoom-out), the processor 311 may obtain an audio signal using the microphone array 303 and may additionally obtain an audio signal collected by the at least one external device 340.

According to various embodiments, the memory 309 may store a command or data associated with at least one other component of the electronic device 300. According to an embodiment, the memory 309 may include a program, an algorithm, a routine, and/or an instruction associated with storing an image. The memory 309 may include at least one program module instructing each operation of the processor 311 described in various embodiments of the disclosure. The program module may include a program 140 of FIG. 1. According to an embodiment, in storing an image, the memory 309 may include an instruction to obtain an audio signal collected by the at least one external device 340.

An electronic device (e.g., an electronic device 300) according to various embodiments may include a first camera (e.g., a first camera 301-1) disposed on a first surface (e.g., a front surface) of the electronic device to obtain a first image, a second camera (e.g., a second camera 301-2) disposed on a second surface (e.g., a rear surface) of the electronic device, the second surface being opposite to the first surface, to obtain a second image, a communication module (e.g., a communication circuit 313) configured to establish communication with an external device (e.g., at least one external device 340), a plurality of microphones (e.g., a microphone array 303), and a processor (e.g., a processor 311) electrically connected with the first camera, the second camera, the communication module, and the plurality of microphones. The processor may be configured to identify an audio reception range for at least some of the plurality of microphones, while the first image and the second image are obtained, store a first audio signal collected through the plurality of microphones with the first image and the second image, when the audio reception range corresponds to a first range, obtain and synthesize a second audio signal collected by the external device with the first audio signal, when the audio reception range corresponds to a second range narrower than the first range, and store the synthesized audio signal with the first image and the second image.

According to various embodiments, the processor may be configured to provide the synthesized audio signal to the external device.

According to various embodiments, the processor may be configured to adjust an audio reception range for the plurality of microphones depending on a magnification for at least one of the first image or the second image.

According to various embodiments, the electronic device may further include at least one output device (e.g., an output module 307). The processor may be configured to output the first image and the second image as one screen through the at least one output module and output information indicating reception of the second audio signal through the at least one output module, when the audio reception range corresponds to the second range.

According to various embodiments, the processor may be configured to establish communication with the external device, when a specified subject is included in at least one of the first image or the second image.

According to various embodiments, the processor may be configured to establish communication with the external device, when the audio reception range corresponds to the second range and when a specified subject is included in at least one of the first image or the second image.

According to various embodiments, the processor may be configured to adjust a level of the first audio signal based on a magnification of the first image, adjust a level of the second signal based on a magnification of the second image, and store the first audio signal and the second audio signal, the levels of which are adjusted, with the first image and the second image.

According to various embodiments, the processor may be configured to receive a user input instructing to obtain the second audio signal, before obtaining the second audio signal collected by the external device.

According to various embodiments, the plurality of microphones may include at least one first microphone (e.g., a third microphone 303-3) disposed on the second surface of the electronic device to have directionality and at least one second microphone (e.g., a first microphone 303-1 and a second microphone 303-2) disposed on a surface different from the second surface of the electronic device to have non-directionality.

According to various embodiments, the processor may be configured to control an operation of the at least one second microphone, when the audio reception range corresponds to the second range.

Figure 5A:
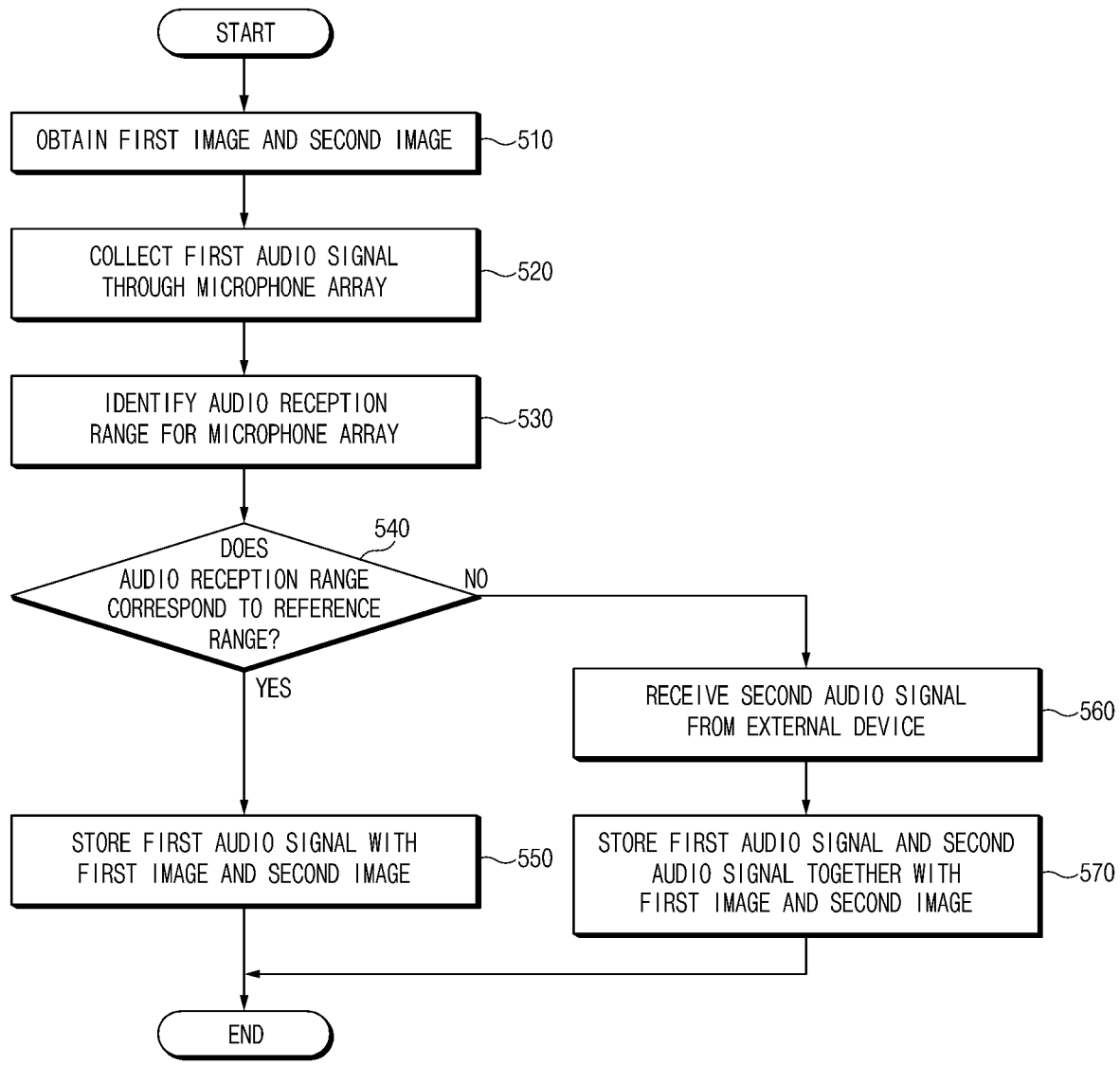
FIG. 5A is a flowchart illustrating an operation of storing an image in an electronic device according to an embodiment of the disclosure.
Figure 5B:
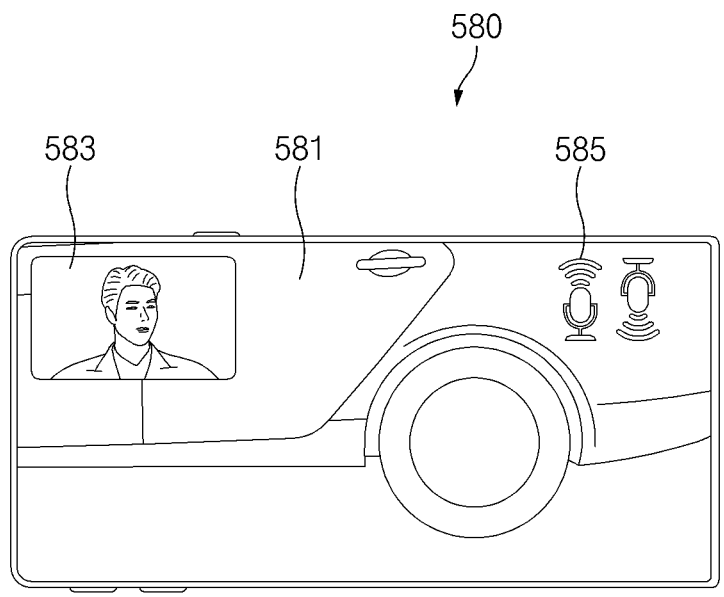
FIG. 5B is a drawing illustrating an operation of receiving an audio signal from an external device in an electronic device according to an embodiment of the disclosure.
Figure 5B:
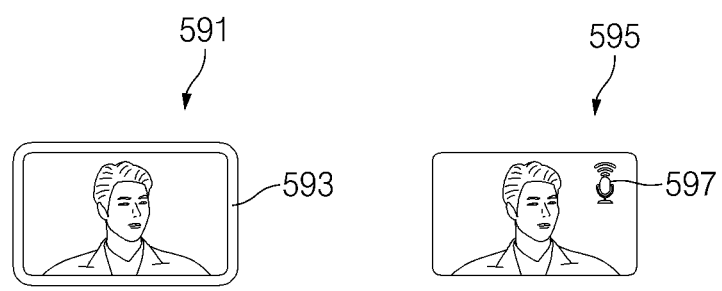

FIG. 5A is a flowchart illustrating an operation of storing an image in an electronic device according to an embodiment of the disclosure. FIG. 5B is a drawing illustrating an operation of receiving an audio signal from an external device in an electronic device according to an embodiment of the disclosure.

Respective operations in an embodiment below may be sequentially performed, but are not necessarily sequentially performed. For example, an order of the respective operations may be changed, and at least two operations may be performed in parallel. Furthermore, at least one of the above-mentioned operations may be omitted according to an embodiment.

Referring to FIG. 5A, in operation 510, an electronic device 300 (or a processor 311) according to various embodiments may obtain a first image (e.g., an image 430 with respect to a first subject 420 of FIG. 4A) and a second image (e.g., an image 440 with respect to a second subject 410 of FIG. 4A). According to an embodiment, the electronic device 300 may output the first image with respect to a first surface (e.g., a front surface) of the electronic device 300, which is obtained by means of a first camera 301-1 disposed on the first surface of the electronic device 300. Furthermore, the electronic device 300 may output the second image with respect to a second surface of the electronic device 300, which is obtained by means of a second camera 301-2 disposed on the second surface of the electronic device 300. In this regard, the electronic device 300 may output the first image and the second image as one screen.

According to various embodiments, in operation 520, the electronic device 300 (or the processor 311) may collect a first audio signal through a microphone array 303. As described above with reference to FIG. 3, the microphone array 303 may include a first microphone 303-1 disposed on a partial region of an upper end of the electronic device 300, a second microphone 303-2 disposed on a partial region of a lower end of the electronic device 300, and a third microphone 303-3 disposed on a partial region of a rear part of the electronic device 300.

According to an embodiment, while a zoom magnification of the second camera 301-2 (or the first camera 301-1) is not changed (or when a default magnification (e.g., one time) is maintained), the electronic device 300 may obtain an audio signal having sound quality of a certain level or more with respect to a first subject 420 located in front of the electronic device 300 and a second subject 410 located behind the electronic device 300 through a microphone array 303. According to an embodiment, when the zoom magnification of the second camera 301-2 (or the first camera 301-1) is changed (e.g., zoomed in) while not maintaining the default magnification, the electronic device 300 may more intensively obtain the audio signal with respect to the second subject 410 located behind the electronic device 300 than the first subject 420 located in front of the electronic device 300 through the microphone array 303. For example, as will be described below with reference to FIG. 7, the electronic device 300 may adjust an audio reception range (or a width of a sound beam) to face the second subject 410 depending on a change in zoom magnification to obtain the audio signal with respect to the second subject 410 to which a weight is assigned.

According to various embodiments, in operation 530, the electronic device 300 (or the processor 311) may identify the audio reception range for the microphone array 303. The audio reception range may be a reception angle of a sound beam formed in the direction of a subject (e.g., the first subject 420 and/or the second subject 410). For example, the electronic device 300 may identify an oriented direction and/or angle of the microphone array 303, corresponding to the zoom magnification of the second camera 301-2 (or the first camera 301-1).

According to various embodiments, in operation 540, the electronic device 300 (or the processor 311) may determine whether the audio reception range for the microphone array 303 corresponds to a reference range. The reference range may be a threshold reception range capable of obtaining an audio signal having sound quality of a certain level or more with respect to the second subject 410 located behind the electronic device 300, as well as the first subject 420 located in front of the electronic device 300, through the microphone array 303.

For example, when the audio reception range corresponds to the reference range may be when the zoom magnification of the second camera 301-2 (or the first camera 301-1) is less than a certain level (e.g., two times), which may be a situation where the audio signal having the sound quality of the certain level or more is obtained with respect to the first subject 420 located in a direction opposite to an oriented direction of the second camera 301-2.

Furthermore, when the audio reception range does not correspond to the reference range may be when the zoom magnification of the second camera 301-2 (or the first camera 301-1) is greater than or equal to the certain level, which may be a situation where an audio signal having sound quality of less than the certain level is obtained with respect to the first subject 420 located in a direction opposite to an oriented direction of the second camera 301-2.

According to various embodiments, when the audio reception range corresponds to the reference range, in operation 550, the electronic device 300 (or the processor 311) may store the first image and the second image together with a first audio signal collected through the microphone array 303.

According to various embodiments, when the audio reception range does not correspond to the reference range, in operation 560, the electronic device 300 (or the processor 311) may receive a second audio signal from an external device 340. The second audio signal may be an audio signal collected by the external device 340 (e.g., a microphone 322, 324, 332, or 334 of the external device 340), which may have sound quality of the certain level or more with respect to a subject located adjacent to the external device 340 (e.g., the first subject 420 located in front of the electronic device 300 of FIG. 4A). In this regard, the electronic device 300 may output guide information indicating that the second audio signal is received from the external device 340. According to an embodiment, as shown in part (a) of FIG. 5B, the electronic device 300 may output (580) an icon 585 indicating that the audio signal is received by the electronic device 300 and the external device 340 together with a first image 583 and a second image 581. However, this is merely illustrative, and the disclosure is not limited thereto. For example, as shown in part (b) of FIG. 5B, the electronic device 300 may apply an effect 593 to an image of a subject associated with the second audio signal to output (591) the image to be distinguished from another image or may add specified information (e.g., an icon or text) 597 to the image of the subject associated with the second audio signal to output (595) the image.

According to various embodiments, when the second audio signal is received, in operation 570, the electronic device 300 (or the processor 311) may store the first audio signal collected through the microphone array 303 and the second audio signal received from the external device 340 together with the first image and the second image.

Figure 6:
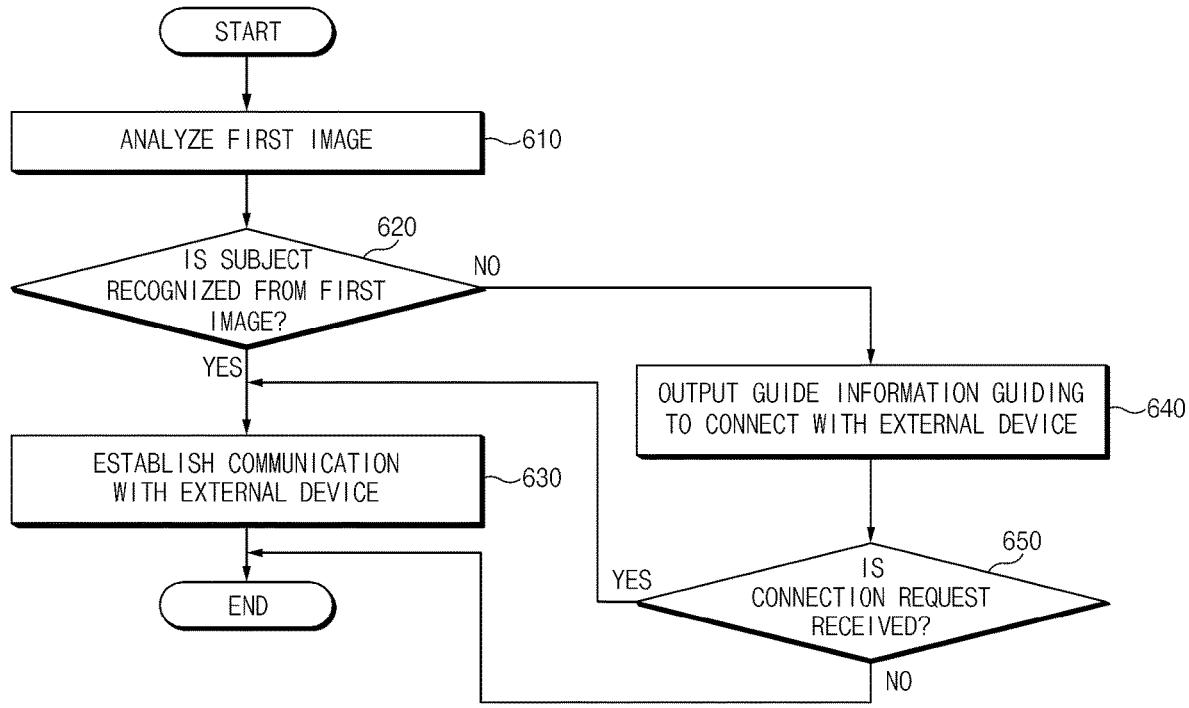
FIG. 6 is a drawing illustrating an operation of obtaining an image in an electronic device according to an embodiment of the disclosure.

FIG. 6 is a drawing illustrating an operation of obtaining an image in an electronic device according to an embodiment of the disclosure. Operations of FIG. 6 described below may indicate various embodiments for operation 510 of FIG. 5A.

Referring to FIG. 6, in operation 610, an electronic device 300 (or a processor 311) according to various embodiments may analyze a first image. The first image may be an image (e.g., a first image 430) obtained by a first camera 301-1 disposed on a first surface (e.g., a front surface) of the electronic device 300.

According to various embodiments, in operation 620, the electronic device 300 (or the processor 311) may determine whether a specified subject is recognized from the first image 430. The specified subject may include a person, an animal, a plant, or a thing. However, this is merely illustrative, and the disclosure is not limited thereto.

According to various embodiments, when the specified subject is recognized from the first image 430, in operation 630, the electronic device 300 (or the processor 311) may establish communication with an external device 340.

According to an embodiment, the electronic device 300 may establish communication while transmitting and receiving a certain signal with the external device 340. For example, the electronic device 300 may request to the external device 340 to collect a second audio signal. Thus, the external device 340 may collect an audio signal through a microphone and may provide the electronic device 300 with the second audio signal, which is at least a portion of the collected audio signal, through communication.

According to an embodiment, the electronic device 300 may maintain an operation of a microphone array 303, while communication is established with the external device 340. For example, the electronic device 300 may establish a first audio channel with the microphone array 303 and may establish a second audio channel with the external device 340. Thus, the electronic device 300 may obtain the second audio signal by means of the external device 340, while collecting the first audio signal through the microphone array 303.

According to various embodiments, when the specified subject is not recognized from the first image, in operation 640, the electronic device 300 (or the processor 311) may output guide information guiding to connect with the external device 340. According to an embodiment, the electronic device 300 may output guide information configured with a menu generating an instruction associated with selecting or canceling a connection with the external device 340.

According to various embodiments, when the guide information is output, in operation 640, the electronic device 300 (or the processor 311) may determine whether an input (e.g., a touch input, a voice input, or a gesture input) requesting to connect with the external device 340 is received. According to an embodiment, when the input requesting to connect with the external device 340 is received, the electronic device 300 may establish communication with the external device 340.

In the above-mentioned embodiment, the operation of establishing the communication with the external device 340 based on the result of analyzing the first image, but the disclosure is not limited thereto. For example, the electronic device 300 may establish communication with the external device 340 based on the result of analyzing a second image obtained by a second camera 301-2 disposed on a second surface (e.g., a rear surface) or may establish communication with the external device 340, when a voice of a predetermined user is detected.

Figure 7:
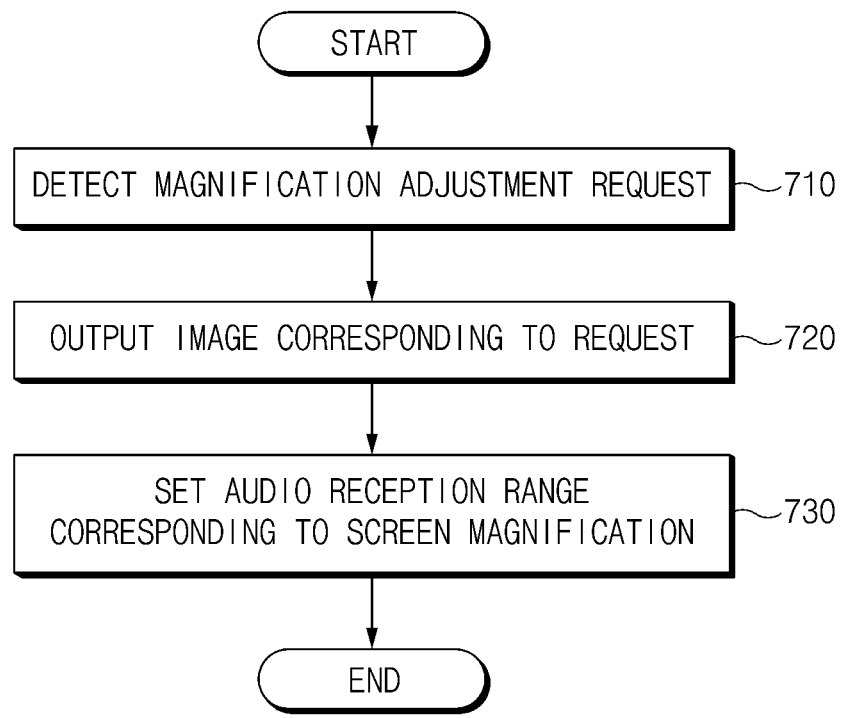
FIG. 7 is a flowchart illustrating an operation of collecting an audio signal in an electronic device according to an embodiment of the disclosure.

FIG. 7 is a flowchart illustrating an operation of collecting an audio signal in an electronic device according to an embodiment of the disclosure. Operations of FIG. 7 described below may indicate various embodiments for operations 510 and 510 of FIG. 5A.

Referring to FIG. 7, in operation 710, an electronic device 300 (or a processor 311) according to various embodiments may detect a magnification adjustment request for a camera module 301. According to an embodiment, the magnification adjustment request may include at least one of a zoom-in request capable of increasing a zoom magnification such that an image screen is concentrated on a specific subject or a zoom-out request capable of decreasing a zoom magnification to put the subject of a wider range on an image screen. For example, the electronic device 300 may detect a magnification request for a second camera 301-2 disposed on a second surface (e.g., a rear surface) of the electronic device 300. However, this is merely illustrative, and the disclosure is not limited thereto. For example, a magnification adjustment request may occur for a first camera 301-1 disposed on a first surface (e.g., a front surface) of the electronic device 300.

According to various embodiments, in operation 720, the electronic device 300 (or the processor 311) may output an image corresponding to the magnification adjustment request. According to an embodiment, the electronic device 300 may zoom in or zoom out and output the image obtained by means of the second camera 301-2 to correspond to the magnification corresponding to the request.

According to various embodiments, in operation 730, the electronic device 300 (or the processor 311) may set an audio reception range corresponding to the screen magnification. According to an embodiment, the electronic device 300 may form a sound beam corresponding to the adjusted magnification and may process a plurality of audio signals to have directionality depending on the sound beam. For example, when the magnification of the second camera 301-2 increases, the electronic device 300 may adjust an audio reception range (or a width of a sound beam) to face a subject (e.g., a second subject 410) located behind the electronic device 300. For example, when the user zooms in on a screen, the electronic device 300 may adjust latency and a weight for each audio signal collected through each microphone and may add the audio signals, each of which has the adjusted latency and weight, to narrow the audio reception range toward the subject (e.g., the second subject 410). Thus, the electronic device 300 may more intensively collect an audio signal associated with the subject (e.g., the second subject 410) than another audio signal.

Figure 8:
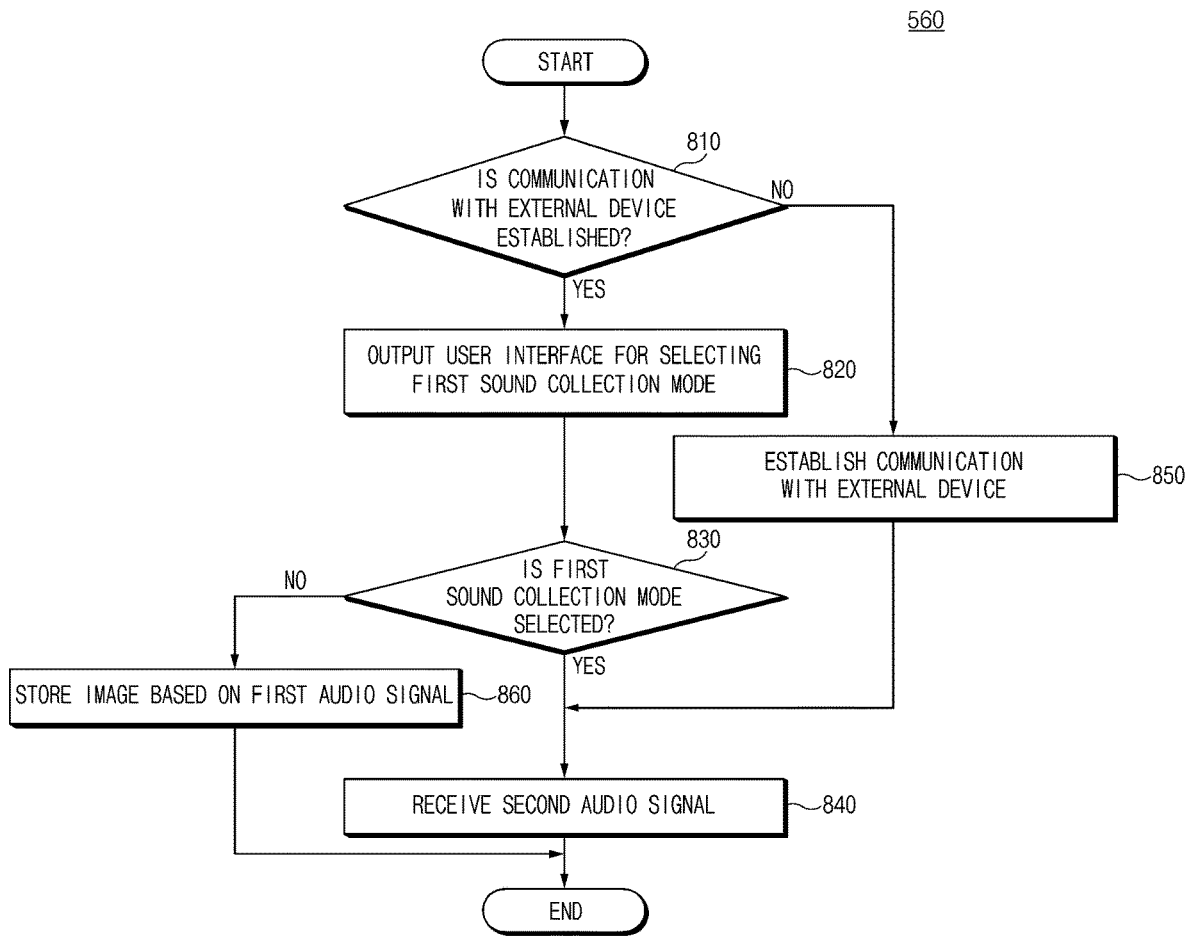
FIG. 8 is a flowchart illustrating an operation of collecting a second audio signal in an electronic device according to an embodiment of the disclosure.

FIG. 8 is a flowchart illustrating an operation of collecting a second audio signal in an electronic device according to an embodiment of the disclosure. Operations of FIG. 8 described below may indicate various embodiments for operation 560 of FIG. 5A.

Referring to FIG. 8, in operation 810, an electronic device 300 (or a processor 311) according to various embodiments may determine whether communication with an external device 340 is established.

According to various embodiments, when it is determined that the communication with the external device 340 is not established, in operation 850, the electronic device 300 (or the processor 311) may establish communication with the external device 340. In this regard, the electronic device 300 may output guide information guiding to connect with the external device 340. According to an embodiment, the electronic device 300 may output guide information configured with a menu generating an instruction associated with selecting or canceling a connection with the external device 340. Furthermore, when an input requesting to connect with the external device 340 is received, the electronic device 300 may establish communication with the external device 340.

According to various embodiments, when it is determined that the communication with the external device 340 is established, in operation 820, the electronic device 300 (or the processor 311) may output a user interface for selecting a first sound collection mode. According to an embodiment, the electronic device 300 may output a user interface for selecting the first sound collection mode or a second sound collection mode. The first sound collection mode may be a mode of collecting an audio signal using microphones located in a plurality of electronic devices (e.g., a microphone array 303 of the electronic device 300 and unit microphones 322, 324, 332, and 334 of the external device 340). The second sound collection mode may be a mode of collecting an audio signal using only the microphone array 303 located in the electronic device 300.

According to various embodiments, when the user interface is output, in operation 830, the electronic device 300 (or the processor 311) may identify whether a user input selecting the first sound collection mode is received.

According to various embodiments, when the first sound collection mode is selected, in operation 840, the electronic device 300 (or the processor 311) may receive a second audio signal through the external device 340. According to an embodiment, the electronic device 300 may collect a first audio signal through the microphone array 303 of the electronic device 300 and may receive the second audio signal collected by the external device 340.

According to various embodiments, when the first sound collection mode is not selected (or when the second sound collection mode is selected), in operation 860, the electronic device 300 (or the processor 311) may store an image based on the first audio signal. According to an embodiment, the electronic device 300 store the first audio signal collected through the microphone array 303 provided in the electronic device 300 together with the image.

Figure 9:
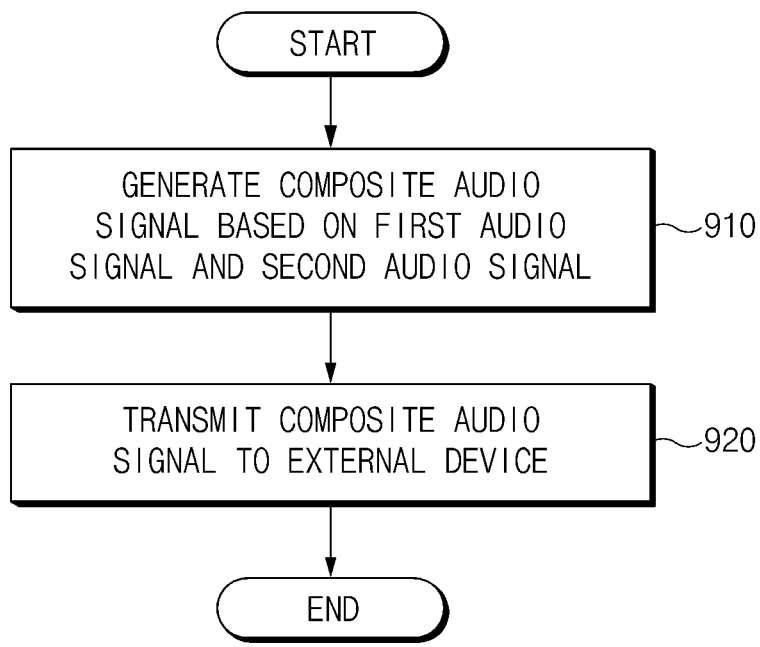
FIG. 9 is a flowchart illustrating an operation of generating a composite audio signal in an electronic device according to an embodiment of the disclosure.

FIG. 9 is a flowchart illustrating an operation of generating a composite audio signal in an electronic device according to an embodiment of the disclosure. Operations of FIG. 9 described below may indicate various embodiments for operation 560 of FIG. 5A.

Referring to FIG. 9, in operation 910, an electronic device 300 (or a processor 311) according to various embodiments may generate a composite audio signal based on a first audio signal and a second audio signal.

According to an embodiment, the first audio signal may be an audio signal collected through a microphone array 303 of the electronic device 300, in a state where an audio reception range is concentrated on a forward second subject 410 a second surface (e.g., a rear surface) of the electronic device 300 is facing by zoom magnification adjustment. For example, the first audio signal may have relatively low sound quality with respect to a forward first subject 420 a first surface (e.g., a front surface) of the electronic device 300 is facing.

According to an embodiment, the second audio signal may be an audio signal collected by an external device 340. For example, the external device 340 may be worn on the first subject 420 or may be disposed adjacent to the first subject 420. Thus, the second audio signal may have sound quality of a certain level or more with respect to the first subject 420.

According to an embodiment, the electronic device 300 may synthesize the first audio signal with the second audio signal to obtain an audio signal having sound quality of a certain level or more with respect to the located first subject 420 in front of the electronic device 300 and obtain an audio signal having the sound quality of the certain level or more with respect to the second subject 410 located behind the electronic device 300.

According to various embodiments, in operation 920, the electronic device 300 (or the processor 311) may transmit the composite audio signal to the external device 340. Thus, the external device 340 may output the received composite signal. A user (e.g., the first subject 420) may identify quality of an audio signal stored together with an image, based on the output composite signal. However, this is merely illustrative, and the disclosure is not limited thereto. For example, the electronic device 300 may transmit only the first audio signal to the external device 340 or may transmit only the second audio signal to the external device 340.

Figure 10A:
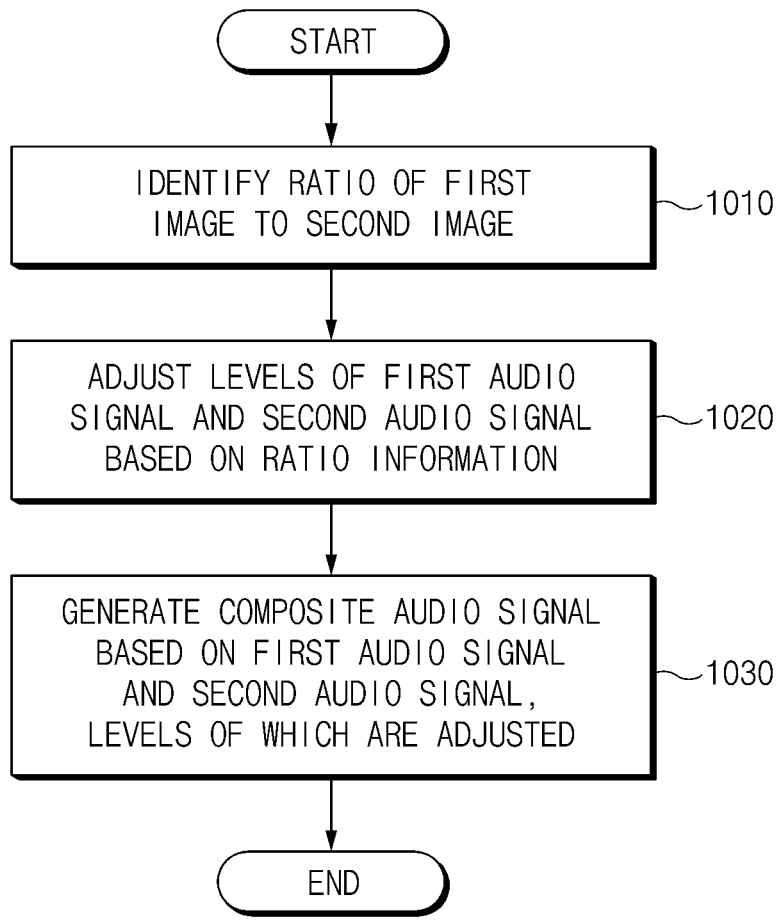
FIG. 10A is a flowchart illustrating an operation of generating a composite audio signal in an electronic device according to an embodiment of the disclosure.
Figure 10B:
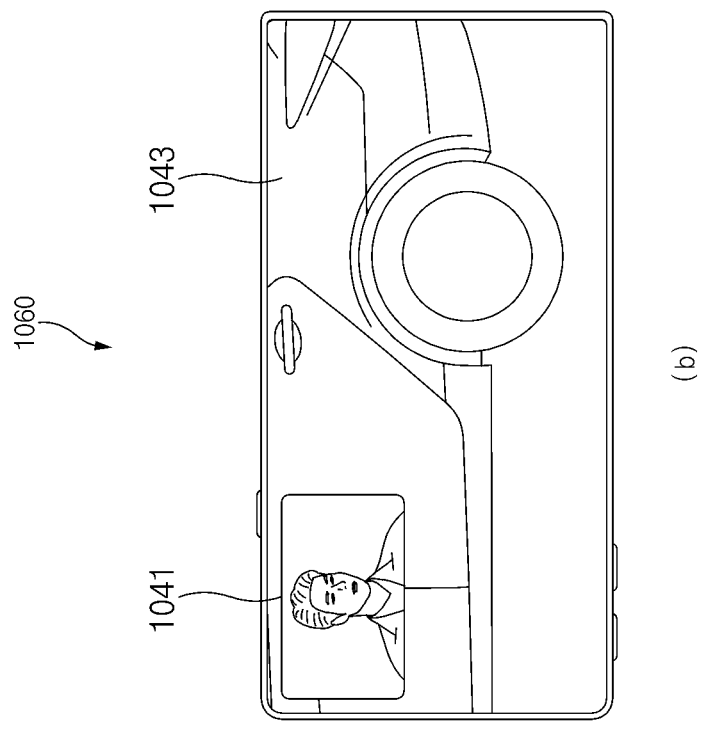
FIG. 10B is a drawing illustrating an operation of adjusting a level of an audio signal in an electronic device according to an embodiment of the disclosure.
Figure 10B:
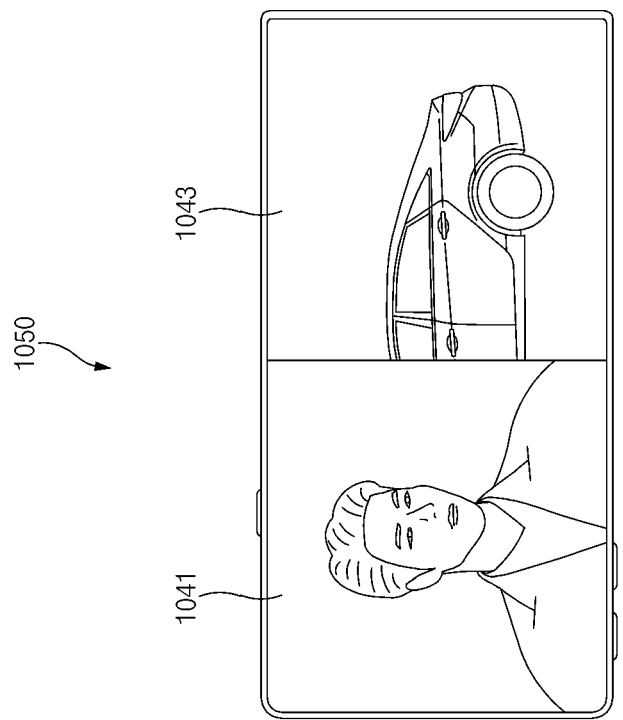

FIG. 10A is a flowchart illustrating an operation of generating a composite audio signal in an electronic device according to an embodiment of the disclosure. FIG. 10B is a drawing illustrating an operation of adjusting a level of an audio signal in an electronic device according to an embodiment of the disclosure. Operations of FIG. 10A described below may indicate various embodiments for operation 570 of FIG. 5A.

Referring to FIG. 10A, in operation 1010, an electronic device 300 (or a processor 311) according to various embodiments may identify the ratio of a first image to a second image, which are output through an output module 307. The first image may be an image obtained by means of a first camera 301-1 of the electronic device 300, and the second image may be an image obtained by means of a second camera 301-2 of the electronic device 300.

According to various embodiments, in operation 1020, the electronic device 300 (or the processor 311 may adjust levels of a first audio signal and a second audio signal based on ratio information. According to an embodiment, as shown in part (a) of FIG. 10B, when it is identified that the ratio of a first image 1041 to a second image 1043 is 1:1 (1050), the electronic device 300 may store the first audio signal collected through a microphone array 303 and the second audio signal received from an external device 340 at a 1:1 level. According to another embodiment, as shown in part (b) of FIG. 10B, when it is identified that the ratio of a first image 1041 to a second image 1043 is 1:4 (1060), the electronic device 300 may store the first audio signal collected through the microphone array 303 and the second audio signal received from the external device 340 at a 1:4 level. However, this is merely illustrative, and the disclosure is not limited thereto. For example, the electronic device 300 may adjust the levels of the first audio signal and the second audio signal based on zoom magnifications of the first image 1041 and the second image 1043.

According to various embodiments, in operation 1030, the electronic device 300 (or the processor 311) may generate a composite audio signal based on the first audio signal and the second audio signal, the levels of which are adjusted.

Figure 11:
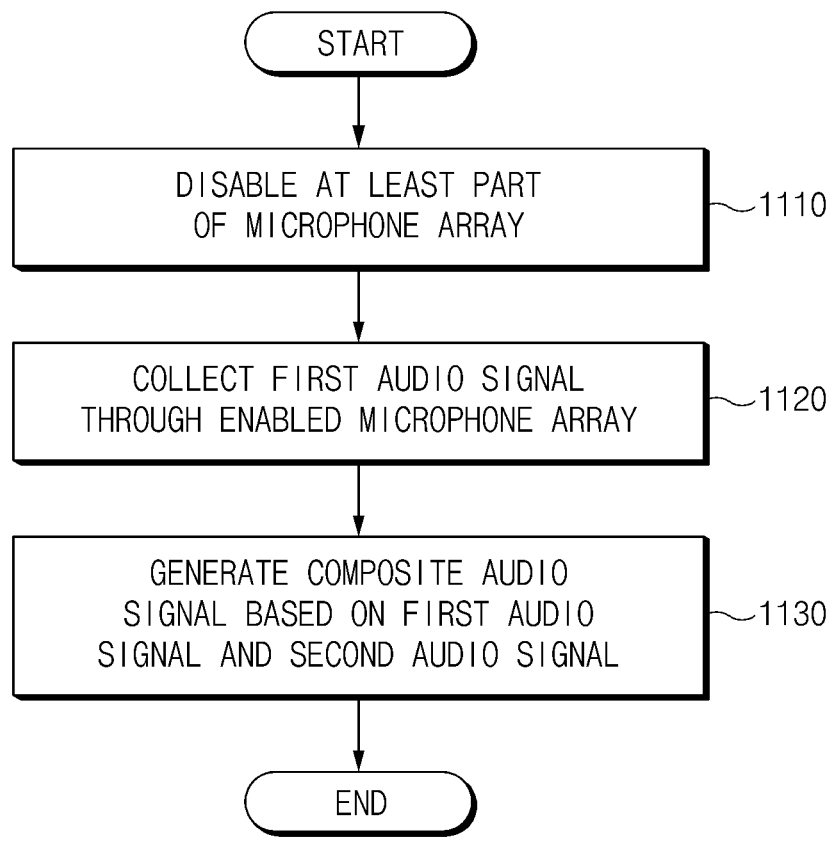
FIG. 11 is a flowchart illustrating an operation of generating a composite audio signal in an electronic device according to an embodiment of the disclosure.

FIG. 11 is a flowchart illustrating an operation of generating a composite audio signal in an electronic device according to an embodiment of the disclosure. Operations of FIG. 11 described below may indicate various embodiments for operation 560 of FIG. 5A.

Referring to FIG. 11, when an audio reception range does not correspond to a reference range (e.g., a zoom magnification of a second camera 301-2 is greater than or equal to a certain level), in operation 1110, an electronic device 300 (or a processor 311) according to various embodiments may disable at least a part of a microphone array 303.

According to an embodiment, the electronic device 300 may restrict a first audio signal (or the first audio signal having sound quality of less than a certain level) with respect to a first subject 420 located in a direction opposite to an oriented direction of the second camera 301-2 to being collected through the microphone array 303. For example, the electronic device 300 may disable a first microphone 303-1 and/or a second microphone 303-2 and may enable only the other microphone (e.g., a third microphone 303-3). For another example, the electronic device 300 may adjust an audio reception range of the first microphone 303-1 and/or the second microphone 303-2 to correspond to an oriented direction of the second camera 301-2.

According to various embodiments, in operation 1120, the electronic device 300 (or the processor 311) may collect a first audio signal through the enabled microphone (e.g., the third microphone 303-3). Thus, the electronic device 300 may intensively collect the first audio signal with respect to a second subject 410 having sound quality of a certain level. Furthermore, the electronic device 300 may obtain a second audio signal with respect to the first subject 420, which has sound quality of the certain level, by means of an external device 340.

According to various embodiments, in operation 1130, the electronic device 300 (or the processor 311) may generate a composite audio signal based on the first audio signal and the second audio signal. For example, when the first audio signal with respect to the first subject 420 is simultaneously collected by the electronic device 300 and the external device 340, a user may feel uncomfortable due to an echo phenomenon or a howling phenomenon with respect to the first audio signal. Thus, the electronic device 300 may intensively collect the audio signal with respect to the first subject 420 by means of the external device 340 to prevent the echo phenomenon or the howling phenomenon from being generated.

Figure 12:
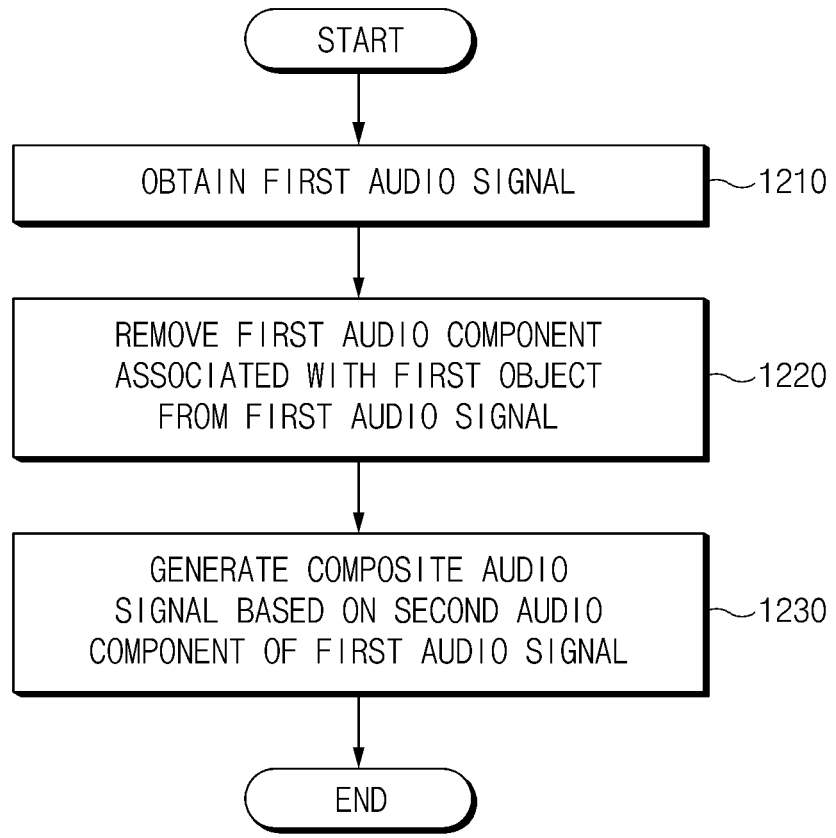
FIG. 12 is a flowchart illustrating an operation of generating a composite audio signal in an electronic device according to an embodiment of the disclosure.

FIG. 12 is a flowchart illustrating an operation of generating a composite audio signal in an electronic device according to an embodiment of the disclosure. Operations of FIG. 12 described below may indicate various embodiments for operation 560 of FIG. 5A.

Referring to FIG. 12, when an audio reception range does not correspond to a reference range (e.g., a zoom magnification of a second camera 301-2 is greater than or equal to a certain level), in operation 1210, an electronic device 300 (or a processor 311) according to various embodiments may obtain a first audio signal through at least a part of a microphone array 303. The first audio signal may include a first audio component with respect to a first subject 420 located in a direction opposite to an oriented direction of a second camera 301-2 and a second audio component with respect to a second subject 410 located in the oriented direction of the second camera 301-2. For example, according to a zoom magnification of the second camera 301-2, the first audio component may have sound quality of less than a certain level, and the second audio component may have sound quality of the certain level or more. For example, a level (or a sound height) of the first audio component associated with the first subject 420 located relatively adjacent to the electronic device 300 may be higher than a level of the second audio component associated with the second subject 410 located relatively apart from the electronic device 300.

According to various embodiments, in operation 1220, the electronic device 300 (or the processor 311) may remove the first audio component from the first audio signal obtained through the microphone array 303. According to an embodiment, the electronic device 300 may extract the first audio component having a first level and the second audio component having a second level different from the first level from the first audio signal and may remove the first audio component from the first audio signal. Furthermore, the electronic device 300 may obtain the second audio signal with respect to the first subject 420, which has sound quality of a certain level, by means of an external device 340. However, this is merely illustrative, and the disclosure is not limited thereto. For example, the first audio component may be removed by adjusting an audio reception range (or a width of a sound beam). In this regard, the electronic device 300 may adjust latency and a weight for each audio signal collected through each microphone. Furthermore, the electronic device 300 may add the respective audio signals, each of which has the adjusted latency and weight, to adjust a reception range for the first audio signal. For example, the electronic device 300 may adjust latency and a weight for each audio signal to relatively amplify the second audio component with respect to the second subject 410 located in the oriented direction of the second camera 301-2 and relatively attenuate the first audio component with respect to the first subject 420 located in a direction opposite to the oriented direction of the second camera 301-2. For example, when an audio reception range is adjusted to face the second subject 410, the electronic device 300 may obtain the second audio signal with respect to the first subject 420, which has sound quality of a certain level, by means of an external device 340.

According to various embodiments, in operation 1230, the electronic device 300 (or the processor 311) may generate a composite audio signal based on the first audio signal and the second audio signal. For example, when the first audio signal with respect to the first subject 420 is simultaneously collected by the electronic device 300 and the external device 340, a user may feel uncomfortable due to an echo phenomenon or a howling phenomenon with respect to the first audio signal. Thus, the electronic device 300 may intensively collect the audio signal with respect to the first subject 420 by means of the external device 340 to prevent the echo phenomenon or the howling phenomenon from being generated.

A method of an electronic device (e.g., an electronic device 300) according to various embodiments may include obtaining a first image by means of a first camera (e.g., a first camera 301-1) disposed on a first surface (e.g., a front surface) of the electronic device, obtaining a second image by means of a second camera (e.g., a second camera 301-2) disposed on a second surface (e.g., a rear surface) of the electronic device, the second surface being opposite to the first surface, identifying an audio reception range for at least some of a plurality of microphones (e.g., a microphone array 303) provided in the electronic device, while the first image and the second image are obtained, storing a first audio signal collected through the plurality of microphones with the first image and the second image, when the audio reception range corresponds to a first range, and obtaining and synthesizing a second audio signal collected by an external device (e.g., at least one external device 340) communicatively connected with the electronic device with the first audio signal, when the audio reception range corresponds to a second range narrower than the first range, and storing the synthesized audio signal with the first image and the second image.

According to various embodiments, the method of the electronic device may include providing the synthesized audio signal to the external device.

According to various embodiments, the method of the electronic device may include adjusting the audio reception range for the at least some of the plurality of microphones depending on a magnification for at least one of the first image or the second image.

According to various embodiments, the method of the electronic device may include outputting information indicating reception of the second audio signal, when the audio reception range corresponds to the second range.

According to various embodiments, the method of the electronic device may include establishing communication with the external device, when a specified subject is included in at least one of the first image or the second image.

According to various embodiments, the method of the electronic device may include establishing communication with the external device, when the audio reception range corresponds to the second range and when a specified subject is included in at least one of the first image or the second image.

According to various embodiments, the method of the electronic device may include adjusting a level of the first audio signal based on a magnification of the first image, adjusting a level of the second signal based on a magnification of the second image, and storing the first audio signal and the second audio signal, the levels of which are adjusted, with the first image and the second image.

According to various embodiments, the method of the electronic device may include receiving a user input instructing to obtain the second audio signal, before obtaining the second audio signal collected by the external device.

According to various embodiments, the plurality of microphones may include at least one first microphone (e.g., a third microphone 303-3) disposed on the second surface of the electronic device to have directionality and at least one second microphone (e.g., a first microphone 303-1 and a second microphone 303-2) disposed on a surface different from the second surface of the electronic device to have non-directionality.

According to various embodiments, the method of the electronic device may include controlling an operation of the at least one second microphone, when the audio reception range corresponds to the second range.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first camera disposed on a first surface of the electronic device to obtain a first image;
a second camera disposed on a second surface of the electronic device, the second surface being opposite to the first surface, to obtain a second image;
a communication module configured to establish communication with an external device;
a plurality of microphones; and
a processor electrically connected with the first camera, the second camera, the communication module, and the plurality of microphones,
wherein the processor is configured to:
identify an audio reception range for at least some of the plurality of microphones, while the first image and the second image are obtained,
store a first audio signal collected through the plurality of microphones with the first image and the second image, when the audio reception range corresponds to a first range,
obtain and synthesize a second audio signal collected by the external device with the first audio signal, when the audio reception range corresponds to a second range narrower than the first range, and
store the synthesized audio signal with the first image and the second image.

2. The electronic device of claim 1, wherein the processor is further configured to:
provide the synthesized audio signal to the external device.

3. The electronic device of claim 1, wherein the processor is further configured to:
adjust an audio reception range for the plurality of microphones depending on a magnification for at least one of the first image or the second image.

4. The electronic device of claim 1, further comprising:
at least one output module,
wherein the processor is further configured to:
output the first image and the second image as one screen through the at least one output module, and
output information indicating reception of the second audio signal through the at least one output module, when the audio reception range corresponds to the second range.

5. The electronic device of claim 1, wherein the processor is further configured to:
establish communication with the external device, when a specified subject is included in at least one of the first image or the second image.

6. The electronic device of claim 1, wherein the processor is further configured to:
adjust a level of the first audio signal based on a magnification of the first image,
adjust a level of the second signal based on a magnification of the second image, and
store the first audio signal and the second audio signal, the levels of which are adjusted, with the first image and the second image.

7. The electronic device of claim 1, wherein the processor is further configured to:
receive a user input instructing to obtain the second audio signal, before obtaining the second audio signal collected by the external device.

8. The electronic device of claim 1, wherein the plurality of microphones include at least one first microphone disposed on the second surface of the electronic device to have directionality and at least one second microphone disposed on a surface different from the second surface of the electronic device to have non-directionality.

9. The electronic device of claim 8, wherein the processor is further configured to:
control an operation of the at least one second microphone, when the audio reception range corresponds to the second range.

10. The electronic device of claim 1, wherein the processor is further configured to:

establish communication with the external device, when the audio reception range corresponds to the second range and when a specified subject is included in at least one of the first image or the second image.

11. The electronic device of claim 1, wherein the processor is further configured to:
output the first image and the second image as one screen through at least one output module.

12. A method of an electronic device, the method comprising:
obtaining a first image by means of a first camera disposed on a first surface of the electronic device;
obtaining a second image by means of a second camera disposed on a second surface of the electronic device, the second surface being opposite to the first surface;
identifying an audio reception range for at least some of a plurality of microphones provided in the electronic device, while the first image and the second image are obtained;
storing a first audio signal collected through the plurality of microphones with the first image and the second image, when the audio reception range corresponds to a first range;
obtaining and synthesizing a second audio signal collected by an external device communicatively connected with the electronic device with the first audio signal, when the audio reception range corresponds to a second range narrower than the first range; and
storing the synthesized audio signal with the first image and the second image.

13. The method of claim 12, further comprising:
providing the synthesized audio signal to the external device.

14. The method of claim 12, further comprising:
adjusting the audio reception range for the at least some of the plurality of microphones depending on a magnification for at least one of the first image or the second image.

15. The method of claim 12, further comprising:
outputting information indicating reception of the second audio signal, when the audio reception range corresponds to the second range.

16. The method of claim 12, further comprising:
establishing communication with the external device, when a specified subject is included in at least one of the first image or the second image.

17. The method of claim 12, further comprising:
adjusting a level of the first audio signal based on a magnification of the first image;
adjusting a level of the second signal based on a magnification of the second image; and
storing the first audio signal and the second audio signal, the levels of which are adjusted, with the first image and the second image.

18. The method of claim 12, wherein the plurality of microphones include at least one first microphone disposed on the second surface of the electronic device to have directionality and at least one second microphone disposed on a surface different from the second surface of the electronic device to have non-directionality.

19. The method of claim 12, further comprising:
outputting the first image and the second image as one screen through at least one output module.

20. The method of claim 12, further comprising:
receiving a user input instructing to obtain the second audio signal, before obtaining the second audio signal collected by the external device.

* * * * *